(12) United States Patent
Luo et al.

(10) Patent No.: US 11,963,131 B2
(45) Date of Patent: Apr. 16, 2024

(54) NOTIFICATION METHOD, APPARATUS, AND COMMUNICATIONS SYSTEM

(71) Applicant: HUAWEI TECHNOLOGIES CO., LTD., Shenzhen (CN)

(72) Inventors: Haiyan Luo, Shanghai (CN); Xudong Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 535 days.

(21) Appl. No.: 17/169,800

(22) Filed: Feb. 8, 2021

(65) Prior Publication Data

US 2021/0168758 A1 Jun. 3, 2021

Related U.S. Application Data

(63) Continuation of application No. PCT/CN2019/100098, filed on Aug. 9, 2019.

(30) Foreign Application Priority Data

Aug. 10, 2018 (CN) .......................... 201810914051.3

(51) Int. Cl.
*H04W 68/00* (2009.01)
*H04W 76/11* (2018.01)
(Continued)

(52) U.S. Cl.
CPC .......... *H04W 68/005* (2013.01); *H04W 76/11* (2018.02); *H04W 76/19* (2018.02); *H04W 76/30* (2018.02); *H04W 80/02* (2013.01)

(58) Field of Classification Search
None
See application file for complete search history.

(56) References Cited

U.S. PATENT DOCUMENTS 10,219,317 B2 * 2/2019 Lee ........................ H04W 72/21
10,470,159 B2 * 11/2019 Kim ...................... H04W 72/23
(Continued)

FOREIGN PATENT DOCUMENTS

CN 106063360 A 10/2016
CN 106134240 A 11/2016
(Continued)

OTHER PUBLICATIONS

3GPP TS 38.473 V15.10.0 (Jul. 2020), "3rd Generation Partnership Project; Technical Specification Group Radio Access Network; NG-RAN; F1 application protocol (F1AP)(Release 15)", 222 pages.
(Continued)

*Primary Examiner* — Sai Aung
(74) *Attorney, Agent, or Firm* — Maier & Maier, PLLC

(57) ABSTRACT

Embodiments provide a notification method, an apparatus, and a communications system, and relate to the communications field, to ensure that a DU performs accurate L2 handling in a CU-DU architecture. The notification method includes: a CU sends a first message to the DU, where the first message includes an ID of a first DRB on which bearer type change occurs and first indication information indicating the DU to perform L2 handling; or the first message includes an ID of a first DRB and second indication information indicating that bearer type change occurs. The CU receives a second message sent by the DU, where the second message includes a cell group configuration of the L2 handling.

30 Claims, 10 Drawing Sheets

(51) Int. Cl.
  *H04W 76/19* (2018.01)
  *H04W 76/30* (2018.01)
  *H04W 80/02* (2009.01)

(56) References Cited

U.S. PATENT DOCUMENTS

| | | | |
|---|---|---|---|
| 2016/0338136 A1 | 11/2016 | Zhang et al. | |
| 2018/0124612 A1 | 5/2018 | Babaei et al. | |
| 2018/0279204 A1* | 9/2018 | Kim | H04W 48/02 |
| 2018/0368109 A1* | 12/2018 | Kim | H04W 72/04 |
| 2018/0368204 A1* | 12/2018 | Park | H04L 41/06 |
| 2019/0037631 A1* | 1/2019 | Byun | H04W 76/20 |
| 2019/0150220 A1* | 5/2019 | Byun | H04W 76/11 370/329 |
| 2020/0162211 A1* | 5/2020 | Wang | H04W 76/12 |
| 2020/0196374 A1* | 6/2020 | Lim | H04W 12/04 |
| 2020/0323016 A1* | 10/2020 | Zhang | H04W 12/037 |
| 2020/0383164 A1* | 12/2020 | Kim | H04W 76/12 |

FOREIGN PATENT DOCUMENTS

| | | | | |
|---|---|---|---|---|
| CN | 106162730 A | | 11/2016 | |
| CN | 201711128511 | * | 11/2017 | H04W 56/00 |
| CN | 107872876 A | | 4/2018 | |
| CN | 108282892 A | | 7/2018 | |
| CN | 108307545 A | | 7/2018 | |
| WO | 2015113254 A1 | | 8/2015 | |
| WO | 2018/030798 A1 | | 2/2018 | |
| WO | 2018/059866 A1 | | 4/2018 | |

OTHER PUBLICATIONS

Rapporteur (NEC). "Baseline CR for TS 38.401 covering agreements of RAN3#AH1807." 3GPP TSG-RAN3 Meeting #AH-1807. Montreal, Canada. Jul. 2-6, 2018. R3-184385. 35 pages.

ZTE,"Discussion on Bearer Management over E1 interface", 3GPP TSG RAN3#99, R3-180894, Athens, Greece, Feb. 26-Mar. 2, 2018, 2 pages.

Samsung, "Bearer handling in NR-E-UTRA Dual Connectivity", 3GPP TSG-RAN WG2 Meeting #102, R2-1807551, Busan, Korea, May 21-25, 2018, 3 pages.

Samsung, "(TP for NR BL CR for TS38.473): Discussion on RLC failure for RLC entity associated with SCell only", 3GPP TSG-RAN WG3 NR AdHoc 1807, R3-183868, Montreal, Canada, Jul. 2-6, 2018, 9 pages.

Ericsson, "Bearer Modification procedure", 3GPP TSG-RAN WG3 #99, Tdoc R3-181339, Athens, Greece, Feb. 26-Mar. 2, 2018, 5 pages.

3GPP TS 36.323 V15.0.0, 3rd Generation Partnership Project; Technical Specification Group Radio Access Network; Evolved Universal Terrestrial Radio Access (E-UTRA); Packet Data Convergence Protocol (PDCP) specification (Release 15), Jul. 2018, 51 pages.

3GPP TS 37.340 V15.2.0, 3rd Generation Partnership Project; Technical Specification Group Radio Access Network; Evolved Universal Terrestrial Radio Access (E-UTRA) and NR; Multi-connectivity; Stage 2 (Release 15), Jun. 2018, 55 pages.

3GPP TS 38.321 V15.2.0, 3rd Generation Partnership Project; Technical Specification Group Radio Access Network; NR; Medium Access Control (MAC) protocol specification (Release 15), Jun. 2018, total 73 pages.

3GPP TS 38.323 V15.2.0, 3rd Generation Partnership Project; Technical Specification Group Radio Access Network; NR; Packet Data Convergence Protocol (PDCP) specification (Release 15), Jun. 2018, 26 pages.

3GPP TS 38.331 V15.2.1, 3rd Generation Partnership Project; Technical Specification Group Radio Access Network; NR; Radio Resource Control (RRC) protocol specification (Release 15), Jun. 2018, 303 pages.

3GPP TS 38.401 V15.2.0, 3rd Generation Partnership Project; Technical Specification Group Radio Access Network; NG-RAN; Architecture description (Release 15), Jun. 2018, 39 pages.

3GPP TS 38.473 V15.2.1, 3rd Generation Partnership Project; Technical Specification Group Radio Access Network; NG-RAN; F1 application protocol (F1AP) (Release 15), Jul. 2018, 161 pages.

Huawei, HiSilicon., "Allowed bearer type change options for LTE-NR DC", 3GPP TSG-RAN WG2 Meeting #97bis R2-1703650, Spokane, USA, Apr. 3-7, 2017, 4 pages.

\* cited by examiner

NOTIFICATION METHOD, APPARATUS, AND COMMUNICATIONS SYSTEM

CROSS-REFERENCE TO RELATED APPLICATIONS

This application is a continuation of International Application No. PCT/CN2019/100098, filed on Aug. 9, 2019, which claims priority to Chinese Patent Application No. 201810914051.3, filed on Aug. 10, 2018. The disclosures of the aforementioned applications are hereby incorporated by reference in their entireties.

TECHNICAL FIELD

The embodiments relate to the communications field, and in particular, to a notification method, an apparatus, and a communications system.

BACKGROUND

With rapid development of communications technologies, mobile communication has entered a 5th generation (5G) mobile communications technology era. For 5G, a two-level access network architecture based on a central unit-distributed unit (CU-DU) has also been recognized in the industry. A combination of the network architecture and wireless cloudification constitutes two basic elements of a 5G cloud radio access network (C-RAN). It can be understood that the CU-DU architecture is a basis for studying the C-RAN.

Currently, in a 5G radio access network (RAN) architecture, it is considered that a CU and a DU in a base station are independently deployed, to better meet requirements of various scenarios and applications. One base station may include one CU and one or more DUs. A CU-DU division manner of the base station is invisible to the outside. When the base station uses the CU-DU architecture, protocol layers are divided. The DU is responsible for a radio link control (RLC) layer/media access control (MAC) layer/physical (PHY) layer. The CU is responsible for a radio resource control (RRC)/service data adaptation protocol (SDAP)/packet data convergence protocol (PDCP) layer. The CU/DU performs a related configuration on a protocol layer for which the CU/DU is responsible.

In a network application, a case (such as bearer type change or an RLC failure) in which layer 2 (L2) handling is required usually occurs. However, in the CU-DU architecture, how the DU learns of a case in which the L2 handling needs to be performed, and correspondingly configures the RLC layer and the MAC layer becomes a problem that urgently needs to be resolved.

SUMMARY

Embodiments provide a notification method, an apparatus, and a communications system, to ensure that a distributed unit (DU) performs accurate L2 handling in a central unit-distributed unit (CU-DU) architecture.

To achieve the foregoing objective, the following embodiments are provided.

According to one aspect, an embodiment provides a notification method, performed by a CU in a CU-DU architecture. The method may include: the CU sends a first message to a DU, where the first message includes an identifier (ID) of a first data radio bearer (DRB) on which bearer type change occurs and first indication information indicating the DU to perform layer 2 (L2) handling; or the first message includes an ID of the first DRB and second indication information indicating that bearer type change occurs. The CU receives a second message sent by the DU, where the second message includes a cell group configuration of the L2 handling.

According to the notification method provided, the CU notifies the DU of the ID of the first DRB on which the bearer type change occurs and the first indication information indicating a solution for performing the L2 handling by the DU. Alternatively, the CU notifies the DU of the ID of the first DRB, and notifies, based on the second indication information, the DU that the bearer type change occurs. In this way, the DU learns of an ID of a DRB on which the bearer type change occurs and the solution associated with the L2 handling. Alternatively, the DU learns of DRBs on which the bearer type change occurs. Therefore, the DU performs accurate and corresponding L2 handling, to perform an L2 configuration that adapts to change of a communications link of a terminal device.

The bearer type switching, namely, bearer type change, is a network operation that is of changing bear types based on a service requirement and that is in a network supporting a plurality of bearer types.

The first indication information is used to indicate a solution that is decided by the CU and that is used for performing the L2 handling by the DU. A type and content of the indication information may be configured based on an actual requirement. This is not limited in the embodiments. For example, the first indication information may be name information of the L2 handling. For example, a name of each solution associated with the L2 handling may be defined, and the solution name is used as the first indication information. Alternatively, the first indication information may be content information of the L2 handling. For example, content of the solution associated with the L2 handling may be used as the first indication information. Alternatively, the first indication information may be identification information of the L2 handling. For example, an identifier of each solution associated with the L2 handling may be configured, and the identifier is used as the first indication information. However, any information that may be used to indicate the specific solution associated with the L2 handling may be used as the first indication information.

The second indication information is used to notify the DU that the bearer type change occurs. A form and content of the second indication information may be configured based on an actual requirement. This is not limited in the embodiments. For example, the second indication information may be name information of the network operation of the bearer type change. For example, a "bearer type change" field, a "key change" field, or a "bearer type change with key change" field is used as the second indication information. Alternatively, the second indication information may be identification information of the network operation of the bearer type change. For example, a network identifier of the network operation of the bearer type change is defined in a network, and is used to uniquely indicate that the bearer type change occurs, and the network identifier is used as the first indication information. Any information that may be used to indicate that the network operation of the bearer type change occurs may be used as the second indication information.

It can be noted that the first DRB may be at least one DRB. Same L2 handling or different L2 handling is performed on each first DRB, and a specific solution is described by using an example in which one first DRB is processed in the embodiments. Details are not described again in other cases.

In one embodiment, there are provided several specific solutions for performing the L2 handling. The performing L2 handling may include: media access control (MAC_reset and radio link control (RLC) re-establishment; change of a logical channel identifier (LCID) (change of LCID), and RLC re-establishment; MAC synchronous reconfiguration (MAC reset by reconfiguration with sync) and RLC re-establishment; or change of LCID, and RLC bearer release and add. The MAC synchronous reconfiguration, in some embodiments, may be understood as implementing the MAC reset through synchronous reconfiguration.

In one embodiment, for a specific solution associated with the L2 handling, refer to a specific solution in Table A-1 defined in the 3rd generation partnership project (3GPP) protocol TS 37.340 V15.2.0 or R2-1810953, where a name of the table is L2 handling for bearer type change with or without security key change (L2 handling for bearer type change with and without security key change). Details are not described herein.

In one embodiment, the first message may further include a master cell group (MCG) indication, and the MCG indication is used to indicate that a base station in the CU-DU architecture is a master node (MN) in a dual connectivity architecture. In this case, that the DU performs L2 handling may include: the MAC reconfiguration and the RLC re-establishment, or the change of LCID, and the RLC re-establishment.

The MCG indication may be an MCG character string, or another preconfigured character or bit. For example, an MCG/SCG indication includes an enumerated value MCG, or that an MCG/SCG indication=0 indicates an MCG. This is not limited in the embodiments.

It can be noted that the dual-connectivity architecture in the embodiments may be an evolved terrestrial radio access network (E-UTRAN)-new radio (NR) dual connectivity (EN-DC) architecture, or may be a multi-radio access type dual connectivity (MR-DC) architecture, or may be NR-DC, namely, new radio dual connectivity, or may be long term evolution (LTE) DC, namely, LTE dual connectivity, or another dual connectivity architecture. This is not limited in the embodiments.

In one embodiment, the first message may further include a secondary cell group (SCG) indication, and the SCG indication is used to indicate that a base station in the CU-DU architecture is a secondary node (SN) in a dual connectivity architecture. In this case, that the DU performs L2 handling may include: the MAC synchronous reconfiguration and the RLC re-establishment; or the change of LCID, and the RLC bearer release and add.

The SCG indication may be an SCG character string or another preconfigured character or bit. For example, an MCG/SCG indication includes an enumerated value SCG, or that an MCG/SCG indication=1 indicates an SCG. This is not limited in the embodiments.

In one embodiment, the first message may further include an ID of a second DRB, where the ID of the second DRB is used to replace the ID of the first DRB. During the bearer type change, when a DRB ID needs to be changed, the first message includes the ID of the second DRB to replace the ID of the first DRB.

It may be noted that during the bearer type change, a bearer identifier used after the change may alternatively be the same as a bearer identifier used before the change. In this case, the first message may not include the ID of the second DRB.

In one embodiment, the first message may include, but is not limited to, a UE context modification request message, an F1 interface message, or a W1 interface message. However, a type of the first message may be selected based on an actual requirement. This is not limited in the embodiments.

In one embodiment, the first message may be a CU-DU interface message, namely, a message transmitted on an interface between the CU and the DU. When network standards of the CU-DU architecture are different, different names may be defined for the interface message. This is not limited in the embodiments. For example, the F1 interface message is a general term of messages transmitted on an interface between a CU and a DU in a new radio (NR) network. In an LTE network, an interface between a CU and a DU in a base station in a CU-DU architecture may be defined as a W1 interface, and a message transmitted on the W1 interface is referred to as a W1 interface message.

The UE context modification request message is an F1 interface message. However, the first message may be an F1 message of another type. This is not limited in the embodiments.

In one embodiment, the second message may include a response message of the UE context modification request message.

In one embodiment, if the first message is a request message in a request-response mechanism, the second message may be a response message of the first message. If the first message is a message in a non-request-response mechanism, the second message is an independent message. A type of the second message is not limited in the embodiments.

For example, the second message is a UE context modification response message.

In one embodiment, a first field in the UE context modification request message includes the ID of the first DRB and the first indication information; or a first field in the UE context modification request message includes the ID of the first DRB and the second indication information. The first field is any field in the UE context modification request message. This is not limited in the embodiments.

It can be noted that the ID of the first DRB and the first indication information, or the ID of the first DRB and the second indication information may be directly included in the first message at a same level as a field, or may be included in a field in the first message. This is not limited in the embodiments.

In one embodiment, the first field may include a DRB to Be Modified List field of the first DRB.

In one embodiment, the first field may include a newly added field, and a name of the newly added field may be configured based on an actual requirement. This is not limited in the embodiments.

In one embodiment, if the first message includes the ID of the first DRB and the first indication information, the notification method provided in the first aspect of the embodiments may further include: The CU decides a solution for performing the L2 handling. In actual application, an algorithm for the decided solution associated with the L2 handling may be selected based on an actual requirement. This is not limited in the embodiments.

In one embodiment, after the CU receives the second message sent by the DU, the notification method provided in the embodiments may further include: the CU sends, to user equipment (UE), a radio resource control (RRC) reconfiguration message including a cell group configuration, so that the UE performs corresponding L2 handling based on the cell group configuration including the L2 handling, thereby ensuring consistency of network communication.

In one embodiment, the notification method provided in the embodiments may be implemented in a user plane (UP).

In this implementation, the first message includes an interface tunnel endpoint identifier (TEID) corresponding to the ID of the first DRB, and the first indication information. Alternatively, the first message includes a TEID corresponding to the ID of the first DRB, and the second indication information. Alternatively, the first message includes an interface transport layer address corresponding to the ID of the first DRB, and the first indication information. Alternatively, the first message includes an interface transport layer address corresponding to the ID of the first DRB, and the second indication information. Alternatively, the first message includes a TEID corresponding to the ID of the first DRB, an interface transport layer address corresponding to the ID of the first DRB, and the first indication information. Alternatively, the first message includes a TEID corresponding to the ID of the first DRB, an interface transport layer address corresponding to the ID of the first DRB, and the second indication information. For specific implementation of the notification method, refer to specific implementation of the foregoing control plane. Details are not described herein again. In this case, the first message may include a downlink protocol data unit (PDU).

According to another aspect, the embodiments provide another notification method. The method is performed by a DU in a CU-DU architecture. The method may include: the DU receives a first message from a CU, where the first message includes an ID of a first DRB on which bearer type change occurs and first indication information indicating the DU to perform L2 handling; or the first message includes an ID of the first DRB and second indication information indicating that bearer type change occurs. The DU performs the L2 handling. The DU sends a second message to the CU, where the second message includes a cell group configuration of the L2 handling.

According to the notification method provided in the embodiments, the DU obtains, from the CU, the ID of the first DRB on which the bearer type change occurs and the first indication information for performing the L2 handling. Alternatively, the DU obtains, from the CU, the ID of the first DRB and the second indication information indicating that the bearer type change occurs. In this way, the DU learns of an ID of a DRB on which the bearer type change occurs and a solution associated with the L2 handling. Alternatively, the DU learns of DRBs on which the bearer type change occurs. Therefore, the DU performs accurate and corresponding L2 handling, to perform an L2 configuration that adapts to change of a communications link of a terminal device.

In one embodiment, if the first message includes the ID of the first DRB and the second indication information, that the DU performs the L2 handling may include: The DU makes a decision and performs the L2 handling. In actual application, an algorithm for a decided solution associated with the L2 handling may be selected based on an actual requirement. This is not limited in the embodiments.

In one embodiment, this embodiment provides several specific solutions for performing the L2 handling. The performing L2 handling may include: MAC reset and RLC re-establishment; change of LCID, and RLC re-establishment; MAC synchronous reconfiguration (MAC reset by reconfiguration with sync) and RLC re-establishment; or change of LCID, and RLC bearer release and add. Particularly, the MAC synchronous reconfiguration may be specifically understood as implementing the MAC reset through synchronous reconfiguration.

In one embodiment, for a specific solution associated with the L2 handling, refer to a specific solution in Table A-1 defined in the 3GPP protocol TS 37.340. Details are not described herein.

In one embodiment, the first message may further include an MCG indication, and the MCG indication is used to indicate that CU-DU is an MN in a dual connectivity architecture. In this case, that the DU performs L2 handling may include: the MAC reconfiguration and the RLC re-establishment, or the change of LCID, and the RLC re-establishment.

The MCG indication may be an MCG character string, or another preconfigured character or bit. For example, an MCG/SCG indication includes an enumerated value MCG, or that an MCG/SCG indication=0 indicates an MCG. This is not limited in the embodiments.

In one embodiment, the first message may further include an SCG indication, and the SCG indication is used to indicate that CU-DU is an SN in a dual connectivity architecture. In this case, that the DU performs L2 handling may include: the MAC synchronous reconfiguration and the RLC re-establishment; or the change of LCID, and the RLC bearer release and add.

The SCG indication may be an SCG character string, or another preconfigured character or bit. For example, an MCG/SCG indication includes an enumerated value SCG, or that an MCG/SCG indication=1 indicates an SCG. This is not limited in the embodiments.

In one embodiment, the first message may further include an ID of a second DRB, where the ID of the second DRB is used to replace the identifier of the first DRB. During the bearer type change, when a DRB ID needs to be changed, the first message includes the ID of the second DRB to replace the ID of the first DRB. The notification method provided in the second aspect of this embodiment may further include: the DU performs the L2 handling on at least the first DRB or the second DRB.

The DU performs the L2 handling on at least the first DRB or the second DRB. This means that the DU performs a series of operations in the L2 handling, and an operation object may be one or both of the first DRB and the second DRB. For example, if the L2 handling performed by the DU is the RLC bearer release and add, the DU performs a release operation on the first DRB, and an add operation on the second DRB. The DU performs the L2 handling on at least the first DRB or the second DRB. This means that when performing the L2 handling, the DU associates all configurations related to the first DRB with the second DRB. When performing the change of LCID, the DU associates a changed LCID with the identifier of the second DRB. In addition, the DU further associates an F1 interface user plane tunnel associated with the identifier of the first DRB with the identifier of the second DRB.

It can be noted that during the bearer type change, a bearer ID used after the change may alternatively be the same as a bearer ID used before the change. In this case, the first message may not include the ID of the second DRB.

In one embodiment, the first message may include, but is not limited to, a UE context modification request message, an F1 interface message, or a W1 interface message. However, a type of the first message may be selected based on an actual requirement. This is not limited in the embodiments.

In one embodiment, the second message may include a response message of the UE context modification request message.

In one embodiment, if the first message is a message in a request-response mechanism, the second message may be a response message of the first message. If the first message is a message in a non-request-response mechanism, the second message is an independent message. A type of the second message is not limited in the embodiments.

In one embodiment, a first field in the UE context modification request message includes the ID of the first DRB and the first indication information; or a first field in the UE context modification request message includes the ID of the first DRB and the second indication information. The first field is any field in the UE context modification request message. This is not limited in the embodiments.

It can be noted that the ID of the first DRB and the first indication information, or the ID of the first DRB and the second indication information may be directly included in the first message at a same level as a field, or may be included in a field in the first message. This is not limited in the embodiments.

In one embodiment, the first field may include a DRB to Be Modified List field of the first DRB.

In one embodiment, the notification method provided in the embodiments may be implemented in a UP. In this implementation, the first message includes an interface TEID corresponding to the ID of the first DRB, and the first indication information. Alternatively, the first message includes a TEID corresponding to the ID of the first DRB, and the second indication information. Alternatively, the first message includes an interface transport layer address corresponding to the ID of the first DRB, and the first indication information. Alternatively, the first message includes an interface transport layer address corresponding to the ID of the first DRB, and the second indication information. Alternatively, the first message includes a TEID corresponding to the ID of the first DRB, an interface transport layer address corresponding to the ID of the first DRB, and the first indication information. Alternatively, the first message includes a TEID corresponding to the ID of the first DRB, an interface transport layer address corresponding to the ID of the first DRB, and the second indication information. For specific implementation of the notification method, refer to specific implementation of the foregoing control plane. Details are not described herein again. In this case, the first message may include a downlink PDU.

It can be noted that the notification method provided in the first aspect and the notification method provided in the second aspect are a same method described from perspectives of the CU and the DU in the CU-DU architecture. For specific implementation of the notification methods, refer to each other.

According to yet another aspect, the embodiments provide still another notification method. The method is performed by a DU in a CU-DU architecture. The method may include: the DU receives a third message from a CU, where the third message includes an LCID with an RLC failure and indication information indicating the DU to perform L2 handling; or the third message includes an LCID with an RLC failure. The DU performs the L2 handling. The DU sends a fourth message to the CU, where the fourth message includes a cell group configuration of the L2 handling.

According to the notification method provided the embodiments, the DU obtains, from the CU, the LCID with the RLC failure and the indication information indicating the DU to perform the L2 handling. Alternatively, the DU obtains the LCID with the RLC failure from the CU, and determines that the RLC failure occurs. In this way, the DU learns of the LCID with the RLC failure and a solution associated with the L2 handling. Alternatively, the DU learns of LCIDs with the RLC failure. Therefore, the DU performs accurate and corresponding L2 handling, to perform an L2 configuration that adapts to change of a communications link of a terminal device.

The RLC failure, namely, RLC failure, is described as follows: When all serving cells associated with RLC are only secondary cells (SCell) but not primary cells (PCell) or primary secondary cells (PSCell), a case in which a quantity of RLC retransmissions reaches a maximum quantity is referred to as the RLC failure.

In one embodiment, the RLC failure may occur in a dual-connectivity network, or may occur in a carrier aggregation (CA) network. This is not limited in the embodiments.

The indication information indicating the DU to perform the L2 handling is used to indicate a specific solution that is decided by the CU and that is used for performing the L2 handling by the DU when the RLC failure occurs. A type and content of the indication information may be configured based on an actual requirement. This is not limited in the embodiments. For example, the indication information may be name information of the L2 handling. For example, a name of each solution associated with the L2 handling may be defined, and the solution name is used as the indication information. Alternatively, the indication information may be content information of the L2 handling. For example, content of the solution associated with the L2 handling may be used as the indication information. Alternatively, the indication information may be identification information of the L2 handling. For example, an identifier of each solution associated with the L2 handling may be configured, and the identifier is used as the indication information. However, any information that may be used to indicate the specific solution associated with the L2 handling may be used as the indication information indicating the DU to perform the L2 handling.

In one embodiment, the indication information may include any one of the following indications: an indication about whether to keep packet data convergence protocol (PDCP) duplication; an indication about whether to delete PDCP duplication; an indication about whether to remove the LCID; and an indication about whether to keep the LCID. However, based on different solutions associated with the L2 handling, specific content of the indication information may be configured based on an actual requirement. This is not limited in the embodiments.

The PDCP duplication, namely, a PDCP duplication mechanism, is to replicate a PDCP PDU to obtain two PDCP PDUs, and then transmit the PDCP PDUs via two RLC entities.

In one embodiment, if the third message includes only the LCID with the RLC failure, that the DU performs the L2 handling may include: the DU makes a decision and performs the L2 handling. In actual application, an algorithm for a decided solution associated with the L2 handling may be selected based on an actual requirement. This is not limited in the embodiments.

In one embodiment, the performing L2 handling may include at least one of the following solutions: removing the SCells corresponding to the LCID with the RLC failure, removing the LCID with the RLC failure, deactivating the PDCP duplication, keeping the PDCP duplication, deleting the PDCP duplication, and RLC re-establishment. However, a solution for performing the L2 handling may be further configured based on an actual requirement. This is not limited in the embodiments.

In one embodiment, the third message may include but is not limited to a UE context modification request message, an F1 interface message, or a W1 interface message. For example, a type of the third message may be selected based on an actual requirement. This is not limited in the embodiments.

In one embodiment, the first message may be a CU-DU interface message, namely, a message transmitted on an interface between the CU and the DU. When network standards of the CU-DU architecture are different, different names may be defined for the interface message. This is not limited in the embodiments. For example, the F1 interface message is a general term of messages transmitted on an interface between a CU and a DU in an NR network. In an LTE network, an interface between a CU and a DU in a base station in a CU-DU architecture may be defined as a W1 interface, and a message transmitted on the W1 interface is referred to as a W1 message.

The UE context modification request message is an F1 interface message. However, the third message may be an F1 message of another type. This is not limited in the embodiments.

In one embodiment, the fourth message may include a response message of the UE context modification request message.

In one embodiment, if the third message is a request message in a request-response mechanism, the fourth message may be a response message of the third message. If the third message is a message in a non-request-response mechanism, the fourth message is an independent message. A type of the fourth message is not limited in the embodiments.

It can be noted that the LCID with the RLC failure and the indication information, or the LCID with the RLC failure may be directly included in the third message at a same level as a field or may be included in a field in the third message. This is not limited in the embodiments.

In one embodiment, an LCID with RLC failure list field in the UE context modification request message includes the LCID with the RLC failure and the indication information indicating the DU to perform the L2 handling; or an LCID with RLC failure list field in the UE context modification request message includes the LCID with the RLC failure. However, another field in the UE context modification request message may include the LCID with the RLC failure and the indication information indicating the DU to perform the L2 handling, or the LCID with the RLC failure. This is not limited in this embodiment.

In one embodiment, the notification method provided in the embodiments may be implemented in a UP. In this implementation, the third message includes at least a TEID or an interface transport layer address corresponding to the LCID with the RLC failure, an RLC failure indication, and the indication information indicating the DU to perform the L2 handling. Alternatively, the third message includes at least a TEID or an interface transport layer address corresponding to the LCID with the RLC failure, and the indication information indicating the DU to perform the L2 handling. Alternatively, the third message includes at least a TEID or an interface transport layer address corresponding to the LCID with the RLC failure, and an RLC failure indication. For specific implementation of the notification method, refer to specific implementation of the foregoing control plane. Details are not described herein again. In this case, the third message may include a downlink PDU.

According to still another aspect, the embodiments provide still another notification method. The method is performed by a CU in a CU-DU architecture. The method may include: the CU sends a third message to a DU, where the third message includes an LCID with an RLC failure and indication information indicating the DU to perform L2 handling; or the third message includes an LCID with an RLC failure. The CU receives a fourth message sent by the DU, where the fourth message includes a cell group configuration of the L2 handling.

According to the notification method provided in the embodiments, the CU notifies the DU of the LCID with the RLC failure and the indication information indicating the DU to perform the L2 handling. Alternatively, the CU notifies the DU of the LCID with the RLC failure, to notify the DU that the RLC failure occurs. In this way, the DU learns of the LCID with the RLC failure and a solution associated with the L2 handling. Alternatively, the DU learns of LCIDs with the RLC failure. Therefore, the DU performs accurate and corresponding L2 handling, to perform an L2 configuration that adapts to change of a communications link of a terminal device.

It can be noted that the notification method provided in the fourth aspect and the notification method provided in the third aspect are a same method described from perspectives of the CU and the DU in the CU-DU architecture. For specific implementation of the notification methods, refer to each other.

The indication information and the RLC failure have been described in detail in the third aspect, and details are not described herein again.

In one embodiment, in a possible implementation, the indication information may include any one of the following indications: an indication about whether to keep PDCP duplication; an indication about whether to delete PDCP duplication; an indication about whether to remove the LCID; and an indication about whether to keep the LCID. For example, based on different solutions associated with the L2 handling, specific content of the indication information may be configured based on an actual requirement. This is not limited in the embodiments.

In one embodiment, the performing L2 handling may include at least one of the following solutions: removing SCells corresponding to the LCID with the RLC failure, removing the LCID with the RLC failure, deactivating the PDCP duplication, keeping the PDCP duplication, deleting the PDCP duplication, and RLC re-establishment. However, a solution for performing the L2 handling may be further configured based on an actual requirement. This is not limited in packet data convergence protocol.

In one embodiment, the third message may include, but is not limited to, a UE context modification request message, an F1 interface message, or a W1 interface message. However, a type of the third message may be selected based on an actual requirement. This is not limited in the embodiments.

In one embodiment, the fourth message may include a response message of the UE context modification request message.

In one embodiment, if the third message is a request message in a request-response mechanism, the fourth message may be a response message of the third message. If the third message is a message in a non-request-response mechanism, the fourth message is an independent message. A type of the fourth message is not limited in the embodiments.

In one embodiment, an LCID with RLC failure list field in the UE context modification request message includes the LCID with the RLC failure and the indication information indicating the DU to perform the L2 handling; or an LCID with RLC failure list field in the UE context modification request message includes the LCID with the RLC failure. For example, another field in the UE context modification request message may include the LCID with the RLC failure and the indication information indicating the DU to perform the L2 handling, or the LCID with the RLC failure. This is not limited in this embodiment.

In one embodiment, if the third message includes the LCID with the RLC failure, and the indication information, the notification method provided in the fourth aspect of this embodiment may further include: the CU decides a solution for performing the L2 handling. In actual application, an algorithm for the decided solution associated with the L2 handling may be selected based on an actual requirement. This is not limited in the embodiments.

In one embodiment, after the CU receives the fourth message sent by the DU, the notification method provided in this embodiment may further include: the CU sends, to UE, an RRC reconfiguration message including a cell group configuration, so that the UE performs corresponding L2 handling based on the cell group configuration of the L2 handling, thereby ensuring consistency of network communication.

In one embodiment, the notification method provided in this embodiment may be implemented in a UP. In this implementation, the third message includes at least a TEID or an interface transport layer address corresponding to the LCID with the RLC failure, an RLC failure indication, and the indication information indicating the DU to perform the L2 handling. Alternatively, the third message includes at least a TEID or an interface transport layer address corresponding to the LCID with the RLC failure, and the indication information indicating the DU to perform the L2 handling. Alternatively, the third message includes at least a TEID or an interface transport layer address corresponding to the LCID with the RLC failure, and an RLC failure indication. For specific implementation of the notification method, refer to specific implementation of the foregoing control plane. Details are not described herein again. In this case, the third message may include a downlink PDU.

It can be noted that the notification method provided in this application may be performed by the CU/DU, or may be performed by a functional unit or a chip in the CU/DU. This is not limited in the embodiments.

According to another aspect, this embodiment provides a communications apparatus. The apparatus is deployed on a CU in a CU-DU architecture, and the apparatus may include a sending unit and a receiving unit. The sending unit is configured to send a first message to a DU, where the first message includes an ID of a first DRB on which bearer type change occurs and first indication information indicating the DU to perform L2 handling; or the first message includes an ID of a first DRB and second indication information indicating that bearer type change occurs. The receiving unit is configured to receive a second message sent by the DU, where the second message includes a cell group configuration of the L2 handling.

According to the communications apparatus provided in the embodiments, the communications apparatus notifies the DU of the ID of the first DRB on which the bearer type change occurs and the first indication information indicating a solution for performing the L2 handling by the DU. Alternatively, the communications apparatus notifies the DU of the ID of the first DRB, and notifies, based on the second indication information, the DU that the bearer type change occurs. In this way, the DU learns of an ID of a DRB on which the bearer type change occurs and the solution associated with the L2 handling. Alternatively, the DU learns of DRBs on which the bearer type change occurs. Therefore, the DU performs accurate and corresponding L2 handling, to perform an L2 configuration that adapts to change of a communications link of a terminal device.

In one embodiment, the performing L2 handling may include: MAC reset and RLC re-establishment; change of LCID, and RLC re-establishment; MAC synchronous reconfiguration and RLC re-establishment; or change of LCID, and RLC bearer release and add.

In one embodiment, the first message may further include an MCG indication, and the performing L2 handling may include: the MAC reset and the RLC re-establishment; or the change of LCID and the RLC re-establishment.

In one embodiment, the first message may further include an SCG indication, and the performing L2 handling may include: the MAC synchronous reconfiguration and the RLC re-establishment; or the change of LCID, and the RLC bearer release and add.

In one embodiment, the first message may further include an ID of a second DRB, where the ID of the second DRB is used to replace the ID of the first DRB.

It can be noted that the communications apparatus provided in the fifth aspect is configured to perform the notification method provided in the first aspect. For specific implementation of the communications apparatus, refer to the implementation of the first aspect. Details are not described herein again.

According to yet another aspect, the embodiments provide another communications apparatus. The apparatus is deployed on a DU in a CU-DU architecture, and the apparatus may include a receiving unit, a processing unit, and a sending unit. The receiving unit is configured to receive a first message from a CU, where the first message includes an ID of a first DRB on which bearer type change occurs and first indication information indicating a solution for performing L2 handling by the DU; or the first message includes an ID of a first DRB and second indication information indicating that bearer type change occurs. The processing unit is configured to perform the L2 handling. The sending unit is configured to send a second message to the CU, where the second message includes a cell group configuration of the L2 handling.

According to the communications apparatus provided in the embodiments, the communications apparatus obtains, from the CU, the ID of the first DRB on which the bearer type change occurs and the first indication information for performing the L2 handling. Alternatively, the communications apparatus obtains, from the CU, the ID of the first DRB and the second indication information indicating that the bearer type change occurs. In this way, the communications apparatus learns of an ID of a DRB on which the bearer type change occurs and the solution associated with the L2 handling. Alternatively, the communications apparatus learns of DRBs on which the bearer type change occurs. Therefore, the DU on which the communications apparatus is deployed performs accurate and corresponding L2 handling, to perform an L2 configuration that adapts to change of a communications link of a terminal device.

In one embodiment, if the first message includes the ID of the first DRB and the second indication information, the processing unit may be configured to: make a decision and perform the L2 handling.

In one embodiment, the performing the L2 handling may include: MAC reset and RLC re-establishment; change of LCID, and RLC re-establishment; MAC synchronous reconfiguration and RLC re-establishment; or change of LCID, and RLC bearer release and add.

In one embodiment, the first message may further include an MCG indication, and the performing the L2 handling includes: the MAC reset and the RLC re-establishment; or the change of LCID and the RLC re-establishment.

In one embodiment, the first message may further include an SCG indication, and the performing the L2 handling includes: the MAC synchronous reconfiguration and the RLC re-establishment; or the change of LCID, and the RLC bearer release and add.

In one embodiment, the first message may further include an ID of a second DRB, where the ID of the second DRB is used to replace the ID of the first DRB. The processing unit is further configured to perform the L2 handling on at least the first DRB or the second DRB.

It can be noted that the communications apparatus provided in the sixth aspect is configured to perform the notification method provided in the second aspect. For specific implementation of the communications apparatus, refer to the implementation of the second aspect. Details are not described herein again.

According to still another aspect, the embodiments provide still another communications apparatus, deployed on a DU used in a CU-DU architecture, and the apparatus may include a receiving unit, a processing unit, and a sending unit. The sending unit is configured to receive a third message from a CU, where the third message includes an LCID with an RLC failure and indication information indicating the DU to perform L2 handling; or the third message includes an LCID with an RLC failure. The processing unit is configured to perform the L2 handling. The sending unit is configured to send a fourth message to the CU, where the fourth message includes a cell group configuration of the L2 handling.

According to the communications apparatus provided in the embodiments, the communications apparatus obtains, from the CU, the LCID with the RLC failure and the indication information indicating the DU to perform the L2 handling, or the communications apparatus obtains the LCID with the RLC failure from the CU, and determines that the RLC failure occurs. In this way, the communications apparatus learns of the LCID with the RLC failure and a solution associated with the L2 handling. Alternatively, the communications apparatus learns of LCIDs with the RLC failure. Therefore, the DU on which the communications apparatus is deployed performs accurate and corresponding L2 handling, to perform an L2 configuration that adapts to change of a communications link of a terminal device.

In one embodiment, if the third message includes the LCID with the RLC failure, the processing unit is configured to: make a decision and perform the L2 handling.

In one embodiment, the indication information indicating the DU to perform the L2 handling may include any one of the following indications: an indication about whether to keep PDCP duplication; an indication about whether to delete PDCP duplication; an indication about whether to remove the LCID; and an indication about whether to keep the LCID.

In one embodiment, a solution for performing the L2 handling includes at least one of the following solutions: removing SCells corresponding to the LCID with the RLC failure, removing the LCID with the RLC failure, deactivating the PDCP duplication, keeping the PDCP duplication, deleting the PDCP duplication, and RLC re-establishment.

It can be noted that the communications apparatus provided in the seventh aspect is configured to perform the notification method provided in the third aspect. For specific implementation of the communications apparatus, refer to the implementation of the third aspect. Details are not described herein again.

According to another aspect, the embodiments provide still another communications apparatus. The apparatus is deployed on a CU in a CU-DU architecture, and the apparatus may include a sending unit and a receiving unit. The sending unit is configured to send a third message to a DU, where the third message includes an LCID with an RLC failure and indication information indicating the DU to perform L2 handling; or the third message includes an LCID with an RLC failure. The receiving unit is configured to receive a fourth message sent by the DU, where the fourth message includes a cell group configuration of the L2 handling.

According to the communications apparatus provided in the embodiments, the communications apparatus notifies the DU of the LCID with the RLC failure and the indication information indicating the DU to perform the L2 handling. Alternatively, the communications apparatus notifies the DU of the LCID with the RLC failure, to notify the DU that the RLC failure occurs. In this way, the DU learns of the LCID with the RLC failure and a solution associated with the L2 handling. Alternatively, the DU learns of LCIDs with the RLC failure. Therefore, the DU performs accurate and corresponding L2 handling, to perform an L2 configuration that adapts to change of a communications link of a terminal device.

In one embodiment, the indication information indicating the DU to perform the L2 handling may include any one of the following indications: an indication about whether to keep PDCP duplication; an indication about whether to delete PDCP duplication; an indication about whether to remove the LCID; and an indication about whether to keep the LCID.

In one embodiment, the performing L2 handling includes at least one of the following solutions: removing a secondary cell group SCells corresponding to the LCID with the RLC failure, removing the LCID with the RLC failure, deactivating the PDCP duplication, keeping the PDCP duplication, deleting the PDCP duplication, and RLC re-establishment.

It can be noted that the communications apparatus provided in the eighth aspect is configured to perform the notification method provided in the fourth aspect. For specific implementation of the communications apparatus, refer to the implementation of the fourth aspect. Details are not described herein again.

According to yet another aspect, an embodiment provides a communications apparatus. The communications apparatus may implement a function of the CU in the method example in the first aspect or the second aspect. The function may be implemented by hardware, or may be implemented by hardware by executing corresponding software. The hardware or the software includes one or more modules corresponding to the foregoing function.

In one embodiment, a structure of the communications apparatus includes a processor and a transceiver. The processor is configured to support the communications apparatus in performing a corresponding function in the foregoing methods. The transceiver is configured to support communication between the communications apparatus and another device. The communications apparatus may further include a memory. The memory is configured to couple to the processor, and stores a program instruction and data that are necessary for the communications apparatus.

According to still another aspect, an embodiment provides a CU, including a communications apparatus that implements a function of the CU in the method example in the first aspect or the second aspect.

According to another aspect, an embodiment provides a communications apparatus. The communications apparatus may implement a function of the DU in the method example in the first aspect or the second aspect. The function may be implemented by hardware, or may be implemented by hardware by executing corresponding software. The hardware or the software includes one or more modules corresponding to the foregoing function.

In one embodiment, a structure of the communications apparatus includes a processor and a transceiver. The processor is configured to support the communications apparatus in performing a corresponding function in the foregoing methods. The transceiver is configured to support communication between the communications apparatus and another device. The communications apparatus may further include a memory. The memory is configured to couple to the processor, and stores a program instruction and data that are necessary for the communications apparatus.

According to yet another aspect, an embodiment provides a DU, including a communications apparatus that implements a function of the DU in the method example in the first aspect or the second aspect.

According to still another aspect, an embodiment provides a communications system, including the CU described in the tenth aspect and the DU described in the twelfth aspect.

According to another aspect, an embodiment provides a communications apparatus. The communications apparatus may implement a function of the CU in the method example in the third aspect or the fourth aspect. The function may be implemented by hardware, or may be implemented by hardware by executing corresponding software. The hardware or the software includes one or more modules corresponding to the foregoing function.

In one embodiment, a structure of the communications apparatus includes a processor and a transceiver. The processor is configured to support the communications apparatus in performing a corresponding function in the foregoing methods. The transceiver is configured to support communication between the communications apparatus and another device. The communications apparatus may further include a memory. The memory is configured to couple to the processor, and stores a program instruction and data that are necessary for the communications apparatus.

According to yet another aspect, an embodiment provides a CU, including a communications apparatus that implements a function of the CU in the method example in the third aspect or the fourth aspect.

According to still another aspect, an embodiment provides a communications apparatus. The communications apparatus may implement a function of the DU in the method example in the third aspect or the fourth aspect. The function may be implemented by hardware, or may be implemented by hardware by executing corresponding software. The hardware or the software includes one or more modules corresponding to the foregoing function.

In one embodiment, a structure of the communications apparatus includes a processor and a transceiver. The processor is configured to support the communications apparatus in performing a corresponding function in the foregoing methods. The transceiver is configured to support communication between the communications apparatus and another device. The communications apparatus may further include a memory. The memory is configured to couple to the processor, and stores a program instruction and data that are necessary for the communications apparatus.

According to another aspect, an embodiment provides a DU, including a communications apparatus that implements a function of the DU in the method example in the third aspect or the fourth aspect.

According to yet another aspect, an embodiment provides a communications system, including the CU described in the fifteenth aspect and the DU described in the seventeenth aspect.

According to still another aspect, an embodiment provides a computer storage medium, configured to store a computer software instruction used in the foregoing method example. The computer storage medium includes a program designed for performing the first aspect to the fourth aspect.

According to another aspect, an embodiment provides a computer program product. When the computer program product runs on a computer, the computer is enabled to execute a program designed for performing aforementioned aspects.

The solutions provided in the ninth aspect to the twentieth aspect are used to implement the notification methods provided in aforementioned aspects. Therefore, the solutions can achieve same beneficial effects as the solutions provided in aforementioned aspects. Details are not described herein again.

DESCRIPTION OF EMBODIMENTS

Figure 1:
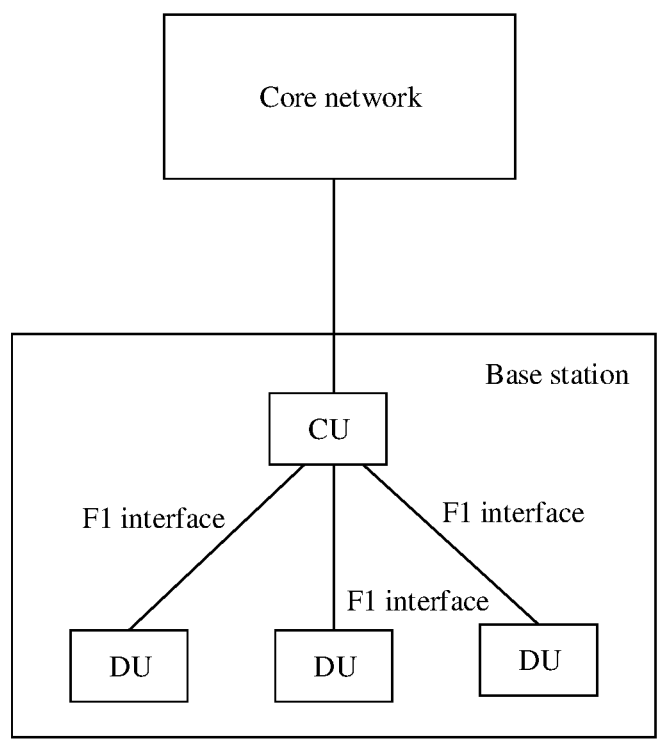
FIG. 1 is a schematic diagram of a CU-DU architecture in the conventional technology.

In a 5G radio access network (RAN) architecture, a CU-DU architecture is proposed, and protocol layers are divided. A DU is responsible for an RLC/MAC/PHY layer, and a CU is responsible for an RRC/SDAP/PDCP layer. When the CU determines that L2 handling (MAC layer and RLC layer configurations) needs to be performed, for example, when a bearer type change occurs or an RLC failure occurs, there is no related implementation solution for how to instruct the DU to perform accurate L2 handling. On this basis, the embodiments provide a notification method to ensure that the DU performs the accurate L2 handling in the CU-DU architecture. A basic principle of the notification method is as follows: the CU decides a solution associated with the L2 handling, and indicates the DU to perform the L2 handling based on the solution decided by the CU. Alternatively, the CU notifies the DU of a case in which the bearer type change or the RLC failure occurs, and the DU makes a decision and performs the L2 handling. Therefore, it is ensured that the DU performs the accurate L2 handling.

To describe an implementation process of the solutions provided in the embodiments more clearly, a scenario of the solutions in the embodiments is first described.

In an LTE or NR radio system, connection of one UE to two or more base stations is supported. For example, one UE is connected to two base stations. The two base stations may have a same radio access technology. For example, both are LTE base stations or both are NR base stations. Alternatively, the two base stations may have different radio access technologies. For example, one is an LTE base station, and the other is an NR base station. A base station that the UE initially accesses is referred to as a master station/MN. Then, the master station indicates the UE to access a secondary station/SN. This manner is usually referred to as dual connectivity (DC). In a dual connectivity technology, radio resources of two base stations are used to provide services for a user, thereby meeting a capacity requirement and a coverage requirement of the user more easily.

An LTE-A carrier aggregation technology is proposed in 3GPP Release 10, which allows frequency bands between different systems, frequency bands, and bandwidths to be used together, to improve system performance by using a wider bandwidth. In the carrier aggregation technology, a plurality of carriers are mainly aggregated at the MAC layer, a plurality of component carriers share a MAC resource, and cross-carrier scheduling needs to be supported at the MAC layer. Usually, one carrier corresponds to one cell. In a dual connectivity mode, if carrier aggregation is performed on the master station, a cell that the UE initially accesses on the master station is referred to as a PCell, and other cells are referred to as SCells. If carrier aggregation is performed on the secondary station, a cell that the UE initially accesses on the secondary station is referred to as a PSCell, and other cells are also referred to as secondary cells.

If a delay of a link used between base stations is relatively large, performance of the carrier aggregation is affected. Therefore, the dual connectivity technology is proposed. In the dual connectivity technology, to avoid a delay requirement and a synchronization requirement in a MAC layer scheduling process, data is split and combined at the PDCP layer, and then user data flows are simultaneously transmitted to the user via a plurality of base stations. In the dual connectivity, two network nodes play different roles. As a radio side anchor of the UE, the master station provides the UE with a network node that is connected to a unique control plane of a core network. The secondary station provides only additional radio resources for the UE to transmit user data and signaling. In the dual connectivity technology, a serving cell group controlled by the MN is referred to as a master cell group (MCG), and a serving cell group controlled by the SN is referred to as a secondary cell group (SCG).

In the dual connectivity, data-plane radio bearers are classified into an MCG bearer, an SCG bearer, and a split bearer based on air interface resources occupied by the data-plane radio bearers. The air interface resources refer to RLC/MAC/PHY layer resources. The MCG bearer occupies only air interface resources on an MN/MCG side. The SCG bearer occupies only air interface resources on an SN/SCG side. The split bearer occupies air interface resources on both the MN/MCG side and the SN/SCG side.

A radio bearer is a channel for data transmission between the UE and the base station, and is a general term of a series of entities and configurations allocated by the base station to the UE. The radio bearer is established when an RRC connection is established. Radio bearers are classified into a signaling radio bearer (SRB) and a DRB based on different content carried by the radio bearers. The SRB carries control-plane signaling data, and is a channel on which a signaling message of a system is actually transmitted. The DRB carries user-plane data, and is a channel on which user data is actually transmitted.

A logical channel is a channel for data transmission at the MAC layer, and an identifier allocated to the logical channel is referred to as an LCID. Usually, one DRB/SRB is associated with one RLC entity and one LCID. When the DRB/SRB performs a split operation (which may be understood as that the DRB/SRB becomes the split bearer), one DRB/SRB is associated with two RLC entities and two LCIDs. When a DRB/SRB performs a PDCP duplication mechanism, one DRB/SRB is associated with two RLC entities and two LCIDs. The only difference between the split operation and a PDCP duplication operation performed by the DRB/SRB is whether a PDCP protocol data unit (PDU) is replicated. For example, when the split operation is performed, the PDCP PDU is not replicated, and PDCP PDUs with different sequence numbers are separately transmitted through two channels, in other words, transmitted via two RLC entities. When the PDCP duplication operation is performed, the PDCP PDU is replicated, and PDCP PDUs with a same sequence number are separately transmitted through two channels. In an RRC reconfiguration message, each LCID has a corresponding ServedRadioBearer that is used to notify the UE of a mapping relationship between the LCID and a DRB/SRB ID.

When the PDCP duplication is performed on the DRB/SRB, one DRB is associated with two RLC entities and two LCIDs, and a 3GPP standard requires that the two different LCIDs need to be scheduled in different serving cells. In the RRC reconfiguration message, LogicalChannelConfig includes an allowedServingCells field corresponding to one LCID. In this way, the UE may obtain a correspondence between the LCID and a serving cell.

Based on requirements of a 5G system for an access network architecture, in a 5G access network logical architecture, it is clear that an access network is divided into logical nodes CU and DU. The CU and the DU form a gNB base station. As shown in FIG. 1, the CU is a centralized node, and is connected to a core network through an NG interface. Inside an access network, the CU can control and coordinate a plurality of cells, and includes protocol stack higher layer control and data functions. The DU is a distributed node, and the DU implements a radio frequency processing function and baseband processing functions such as RLC, MAC, and PHY processing. The CU and the DU are connected through an F1 interface.

Figure 2:
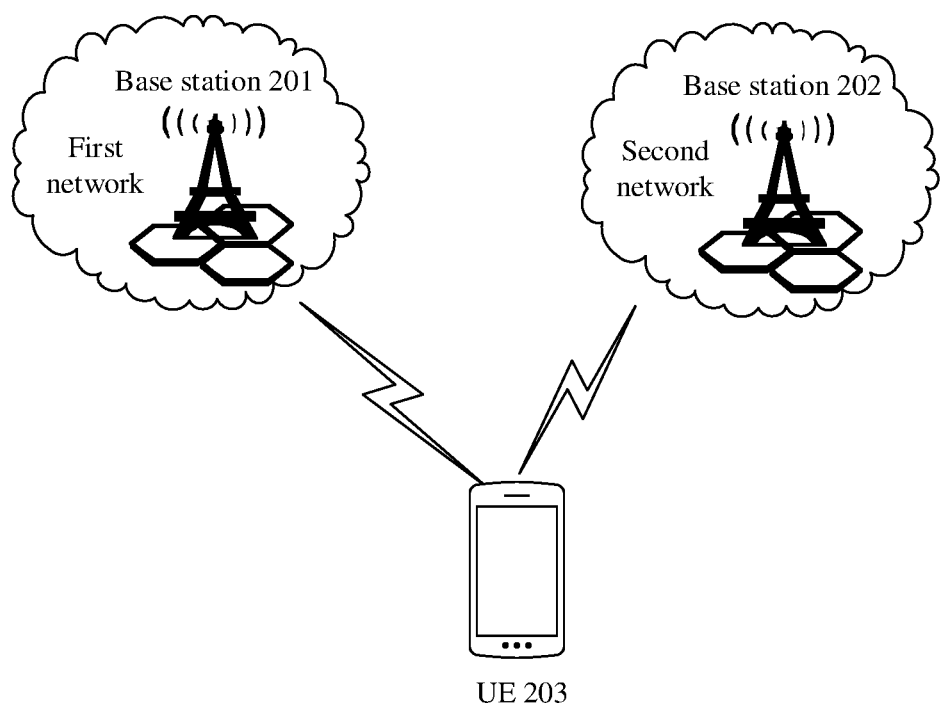
FIG. 2 is a schematic architectural diagram of a dual-connectivity wireless communications system in the conventional technology.

The notification method used when the bearer type change occurs and that is provided in the embodiments is used in a dual-connectivity wireless communications system architecture shown in FIG. 2. As shown in FIG. 2, the wireless communications system architecture includes a base station 201 of a first network, a base station 202 of a second network, and UE 203. The UE 203 obtains data from both the first network and the second network by using radio resources of the base stations 201 and 202. The base station 201 or the base station 202 is configured in the CU-DU architecture shown in FIG. 1. The base station 201 or the base station 202 may be used as an MN or an SN.

For example, the first network in the dual-connectivity wireless communications system architecture shown in FIG. 2 may be an LTE network, and the second network may be a 5G network, and the dual-connectivity wireless communications system architecture is referred to as EN-DC. The first network and the second network in the dual-connectivity wireless communications system architecture shown in FIG. 2 may be two networks having different radio access technologies. For example, the first network is an NR network, and the second network is an LTE network, and the dual-connectivity wireless communications system architecture is referred to as MR-DC. Alternatively, the first network and the second network may be two networks having a same radio access technology. The first network and the second network in the dual-connectivity wireless communications system architecture shown in FIG. 2 may be networks having the same radio access technology. For example, the first network and the second network both are 5G networks, and the dual-connectivity wireless communications system architecture is referred to as NR-DC. For another example, the first network and the second network both are LTE networks, and the dual-connectivity wireless communications system architecture is referred to as LTE dual-connectivity. A type of a network in which a solution of this embodiment is used is not limited in this embodiment.

The notification method used when the RLC failure occurs and that is provided in this embodiment may be used in the dual-connectivity wireless communications system architecture shown in FIG. 2. Alternatively, the method may be used in a wireless communications system architecture in which carrier aggregation is performed. This is not limited in this embodiment.

The foregoing radio access technology refers to an access manner used in various communications systems. The technical solutions in the embodiments may include various radio access technologies, for example, a global system for mobile communications (GSM) access technology, a code division multiple access (CDMA) access technology, a wideband code division multiple access (WCDMA) access technology, a general packet radio service (GPRS) access technology, an LTE access technology, an LTE frequency division duplex (FDD) access technology, an LTE time division duplex (TDD) access technology, a universal mobile telecommunications system (UMTS) access technology, a worldwide interoperability for microwave access (WiMAX) communications access technology, a fifth generation (5G) system, and an NR access technology. A type of a radio access technology in the solutions is not limited in the embodiments.

The UE described in the embodiments is a part or all of a mobile communications device used by a user. For example, the UE may be a mobile phone, a tablet computer, a notebook computer, an ultra-mobile personal computer (UMPC), a netbook, a personal digital assistant (PDA), an e-book, a mobile television, a wearable device, or a personal computer (PC). In communications systems of different standards, the terminal device may have different names. A type of the terminal device is not limited in the embodiments either.

It can be noted that FIG. 2 is merely a schematic diagram of the dual-connectivity wireless communications system architecture by using an example. Types and a quantity of devices included in the wireless communications system architecture may be configured based on an actual requirement. The content is not limited in FIG. 2.

Figure 3:
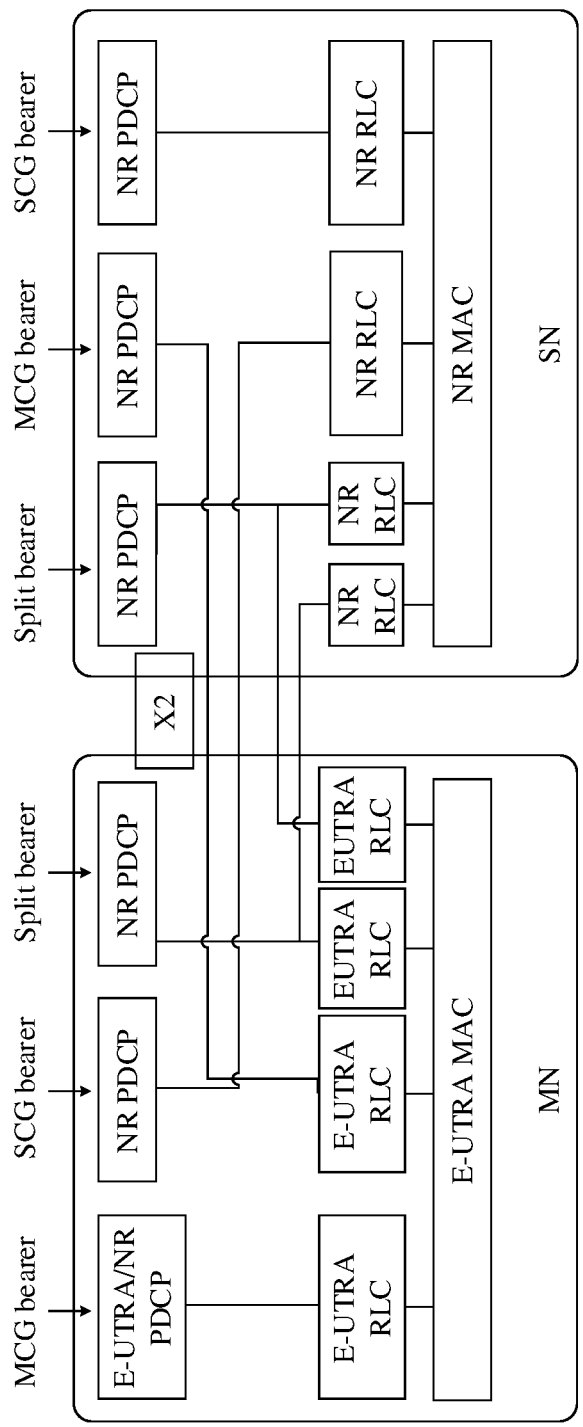
FIG. 3 is a schematic diagram of a plurality of bearer types supported in an MR-DC architecture.

TS 37.340 V15.2.0 in 3GPP RAN 2 discussion defines a plurality of bearer types supported in the MR-DC. FIG. 3 shows a plurality of bearer types supported in an MR-DC architecture. As shown in FIG. 3, the plurality of bearer types supported in MR-DC may include:

an MN terminated MCG bearer;
an MN terminated SCG bearer;
an MN terminated split bearer;
an SN terminated MCG bearer;
an SN terminated SCG bearer; and
an SN terminated split bearer.

An MCG bearer refers to a data-plane radio bearer that occupies only air interface resources on an MCG side and the air interface resources mainly refer to RLC/MAC/PHY layer resources. An SCG bearer refers to a data-plane radio bearer that occupies only air interface resources on an SCG side and that is served only by an SN. A split bearer refers to a data-plane radio bearer that occupies both air interface resources on the MCG side and the air interface resources on the SCG side and that is served by both an MN and the SN. "MN/SN terminated" means that a PDCP entity is in the MN or the SN. Based on an actual network condition (a service condition, a link condition, or a radio resource condition), change may be performed between a plurality of bearer types. This network operation is referred to as bearer type change.

For example, a DRB starts to use only MCG air interface resources. If a CU subsequently finds that signal quality of the SN is good, the CU determines to change the MCG bearer to the split bearer. Alternatively, if a CU finds that load of the SN is relatively small, the CU determines to change the MCG bearer to the SCG bearer. For example, in actual application, there are many scenarios in which the bearer type change occurs, and details are not listed herein.

Before an implementation of a notification method provided in the embodiments is described, names in the embodiments are first explained as follows:

Bearer type switching, namely, bearer type change, is a network operation that is of changing bear types based on a service requirement and that is in a network supporting a plurality of bearer types.

RLC failure is described as follows: when all serving cells associated with RLC include only SCells but not PCells/PSCells, a case in which a quantity of RLC retransmissions reaches a maximum quantity is referred to as the RLC failure. A main reason of the RLC failure may be poor signal quality in a SCell associated with an RLC entity or an LCID, an improper configuration, or the like. When finding that the RLC failure occurs, UE needs to notify a base station. For example, the UE notifies, by using an RRC message, the base station of LCIDs with the RLC failure. In particular, when in a dual connectivity state, the UE further needs to additionally indicate whether those LCIDs with the RLC failure are LCIDs of an MCG or LCIDs of an SCG. For example, the RRC message reported by the UE includes an LCID with RLC failure list, and the list includes the LCIDs. Optionally, each LCID further carries an MCG/SCG indication. In a CU-DU architecture, because a CU is responsible for an RRC module, only the CU knows a case of the RLC failure.

In the embodiments, the terms "first", "second", and the like are intended to distinguish between different objects but do not describe a particular order of the objects. For example, first indication information, second indication information, and the like are used to distinguish between different indication information but are not used to describe a particular order of the information.

In the embodiments, the word "example" or "for example" is used to represent giving an example, an illustration, or a description. Any embodiment or design scheme described as "example" or "for example" in the embodiments should not be explained as being more preferred or having more advantages than another embodiment or design scheme. Instead, use of the word "example", "for example", or the like is intended to present a relative concept in a specific manner for ease of understanding.

The following describes the embodiments in detail with reference to the accompanying drawings.

Figure 4:
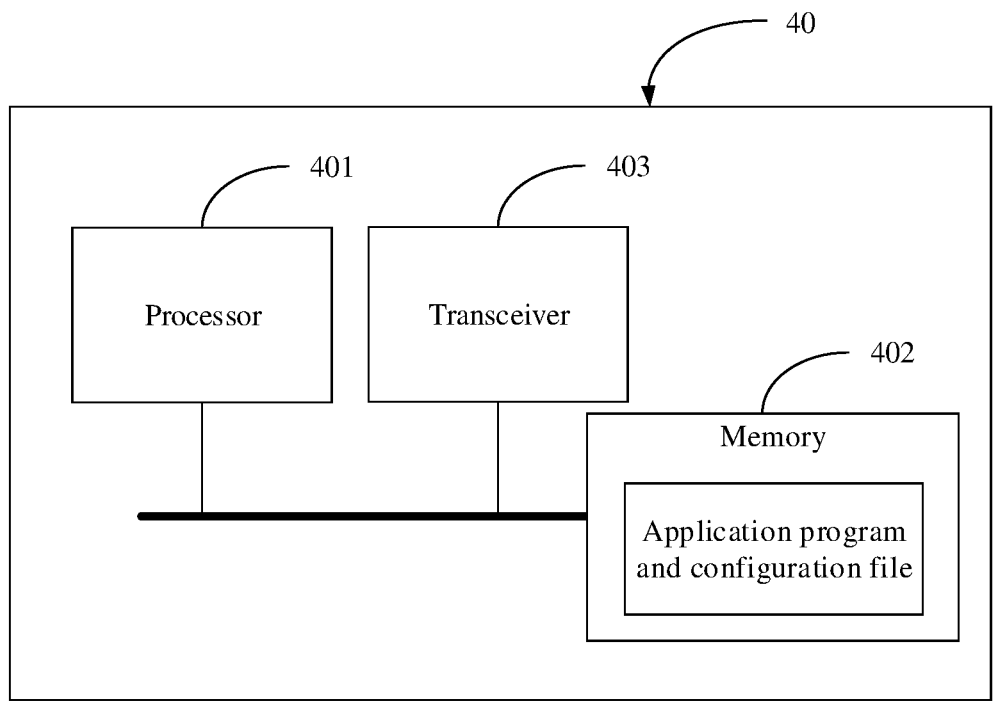
FIG. 4 is a schematic structural diagram of a CU according to an embodiment.

According to an aspect, an embodiment provides a CU. FIG. 4 shows a CU 40 related to the embodiments. The CU 40 may be the CU in the base station using the CU-DU architecture in the dual-connectivity wireless communications system architecture shown in FIG. 1. As shown in FIG. 4, the CU 40 may include a processor 401, a memory 402, and a transceiver 403.

The following describes each composition component of the CU 40 in detail with reference to FIG. 4.

The memory 402 may be a volatile memory such as a random-access memory (RAM), a non-volatile memory such as a read-only memory (ROM), a flash memory, a hard disk (HDD), or a solid-state drive (SSD), or a combination of the foregoing types of memories. The memory 402 is configured to store program code and a configuration file that can implement a method in the embodiments.

As a control center of the CU 40, the processor 401 may be a central processing unit (CPU), or may be an application-specific integrated circuit (ASIC), or may be one or more integrated circuits, such as one or more microprocessors (DSP) or one or more field programmable gate arrays (FPGA), configured to implement the embodiments. The processor 401 may run or execute a software program or a module stored in the memory 402, and invoke data stored in the memory 402, to perform various functions of the CU 40.

The transceiver 403 is configured to enable the CU 40 to interact with another unit. For example, the transceiver 403 may be a transceiver antenna or a communications port of the CU 40.

In a possible implementation, the processor 401 runs or executes the software program or the module stored in the memory 402, and invokes the data stored in the memory 402, to perform the following functions:

sending a first message to a DU via the transceiver 403, where the first message includes an ID of a first DRB on which bearer type change occurs and first indication information indicating the DU to perform L2 handling; or the first message includes an ID of a first DRB and second indication information indicating that bearer type change occurs; and receiving, via the transceiver 403, a second message sent by the DU, where the second message includes a cell group configuration of the L2 handling.

In a possible implementation, the processor 401 runs or executes the software program or the module stored in the memory 402, and invokes the data stored in the memory 402, to perform the following functions:

sending a third message to a DU via the transceiver 403, where the third message includes an LCID with an RLC failure and indication information indicating the DU to perform L2 handling; or the third message includes an LCID with an RLC failure; and receiving, via the transceiver, a fourth message sent by the DU, where the fourth message includes a cell group configuration of the L2 handling.

Figure 5:
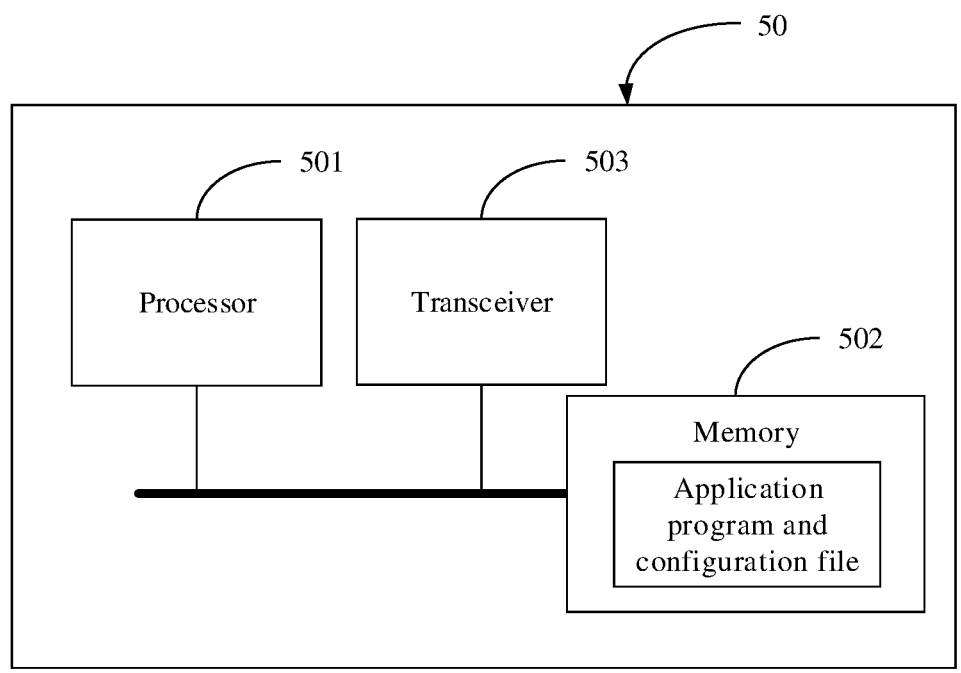
FIG. 5 is a schematic structural diagram of a DU according to an embodiment.

According to another aspect, an embodiment provides a DU. FIG. 5 shows a DU 50 related to the embodiments. The DU 50 may be the DU in the base station configured with the CU-DU architecture in the dual-connectivity wireless communications system architecture shown in FIG. 1. As shown in FIG. 5, the DU 50 may include a processor 501, a memory 502, and a transceiver 503.

The following describes each composition component of the DU 50 in detail with reference to FIG. 5.

The memory 502 may be a volatile memory such as a RAM, a non-volatile memory such as a ROM, a flash memory, an HDD, or an SSD, or a combination of the foregoing types of memories. The memory 502 is configured to store program code and a configuration file that can implement a method.

As a control center of the DU 50, the processor 501 may be a CPU or an ASIC, or one or more integrated circuits, such as one or more DSPs or one or more FPGAs, configured to implement the embodiments. The processor 501 may run or execute a software program or a module stored in the memory 502, and invoke data stored in the memory 502, to perform various functions of the DU 50.

The transceiver 503 is configured to enable the DU 50 to interact with another unit. For example, the transceiver 503 may be a transceiver antenna or a communications port of the DU 50.

In a possible implementation, the processor 501 runs or executes the software program or the module stored in the memory 502, and invokes the data stored in the memory 502, to perform the following functions:

receiving a first message from a CU via the transceiver 503, where the first message includes an ID of a first DRB on which bearer type change occurs and first indication information indicating the DU to perform a solution associated with L2 handling; or the first message includes an ID of a first DRB and second indication information indicating that bearer type change occurs; performing the L2 handling; and sending a second message to the CU via the transceiver 503, where the second message includes a cell group configuration of the L2 handling.

In another possible implementation, the processor 501 runs or executes the software program or the module stored in the memory 502, and invokes the data stored in the memory 502, to perform the following functions:

receiving a third message from a CU via the transceiver 503, where the third message includes an LCID with an RLC failure and indication information indicating the DU to perform L2 handling; or the third message includes an LCID with an RLC failure; performing L2 handling; and sending a fourth message to the CU via the transceiver 503, where the fourth message includes a cell group configuration of the L2 handling.

According to still another aspect, an embodiment provides a notification method, used in a communication process that is between a CU and a DU in a CU-DU architecture and that exists when bearer type change occurs. An operation that is performed by the CU/DU and that is described in this embodiment may be understood as being performed by the CU/DU, or may be understood as being performed by a functional unit or a chip in the CU/DU. This is not limited in this embodiment. The following only describes a case in which an operation is performed by the CU/DU. The functional unit or the chip that performs the notification method provided in this embodiment and that is in the CU/DU may be referred to as a communications apparatus in the embodiments.

Figure 6:
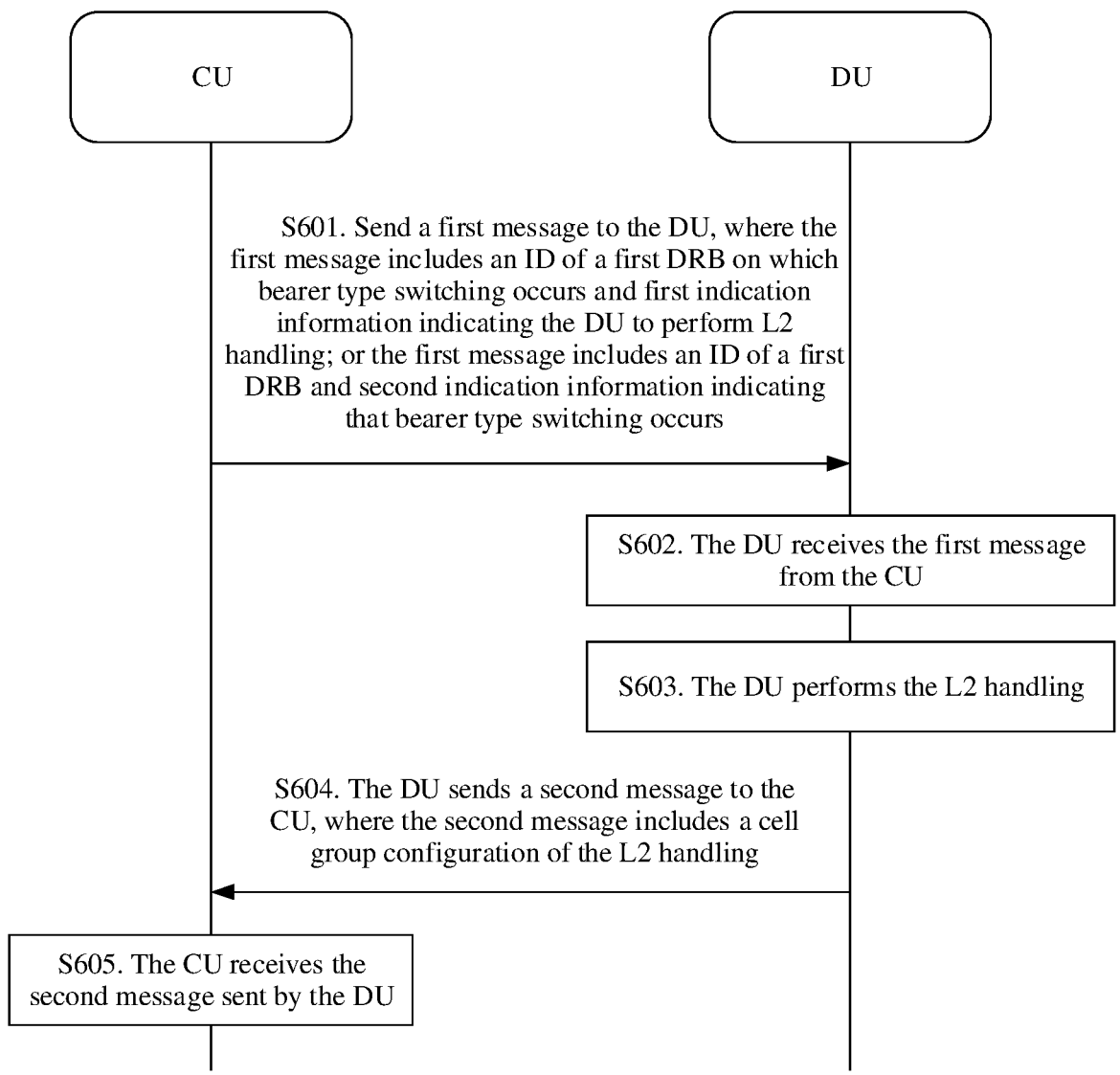
FIG. 6 is a schematic flowchart of a notification method according to an embodiment.

As shown in FIG. 6, the notification method provided in this embodiment may include the following operations.

S601. The CU sends a first message to the DU, where the first message includes an ID of a first DRB on which bearer type change occurs and first indication information indicating the DU to perform L2 handling; or the first message includes an ID of a first DRB and second indication information indicating that bearer type change occurs.

It can be noted that there may be at least one first DRB on which the bearer type change occurs. A quantity of DRBs on which the bearer type change occurs is not limited in this embodiment. A process of performing the solution of this embodiment on each DRB on which the bearer type change occurs is the same.

S601 is performed when the CU determines that the bearer type change occurs.

Optionally, when the CU-DU architecture is used in an SN in a dual-connectivity network, the CU receives an indication sent by an MN, and the indication may include latest network configuration content. The CU determines, based on the indication, that the bearer type change occurs. For example, by comparing two received EN-DC resource configuration fields, the CU learns that the bearer type change occurs, and the CU learns of a specific DRB on which the bearer type change occurs. There may be at least one DRB on which the bearer type change occurs. For example, the CU receives, for the first time, an EN-DC resource configuration indicating that a PDCP entity of a DRB is on the MN, and occupies only air interface resources on an MCG side. The CU receives, for the second time, an EN-DC resource configuration indicating that the PDCP entity of the DRB is on the MN, and occupies both the air interface resources on the MCG side and air interface resources on an SCG side. Therefore, the CU learns that the DRB is switched from an MCG bearer to a split bearer, but a security key does not change.

Optionally, when the CU-DU architecture is used in an MN in a dual-connectivity network, the CU autonomously determines, based on change of a communications link of a terminal device, a DRB on which the bearer type change is to be performed. There may be at least one DRB on which the bearer type change is to be performed. For example, a DRB starts to use only MCG air interface resources. If the CU subsequently finds that signal quality of an SN is good, the CU determines to change an MCG bearer to a split bearer. Alternatively, if the CU finds that load of the SN is relatively small, the CU determines to change an MCG bearer to an SCG bearer. This is merely an example for description, and does not limit a solution in which the CU autonomously determines, based on the change of the communications link of the terminal device, that the bearer type change is to be performed.

It can be noted that the notification method provided in this embodiment is used after the CU determines that the bearer type change occurs. A process about how the CU determines that the bearer type change occurs is not limited, and details are not described herein.

For example, content of the first message in S601 includes the following two cases:

In a first case, the first message includes the ID of the first DRB on which the bearer type change occurs and the first indication information indicating the DU to perform the L2 handling.

In the first case, the CU determines a specific operation of performing the L2 handling by the DU when the bearer type change occurs, and notifies, based on the first indication information, the DU of the specific operation of performing the L2 handling by the DU.

Figure 7:
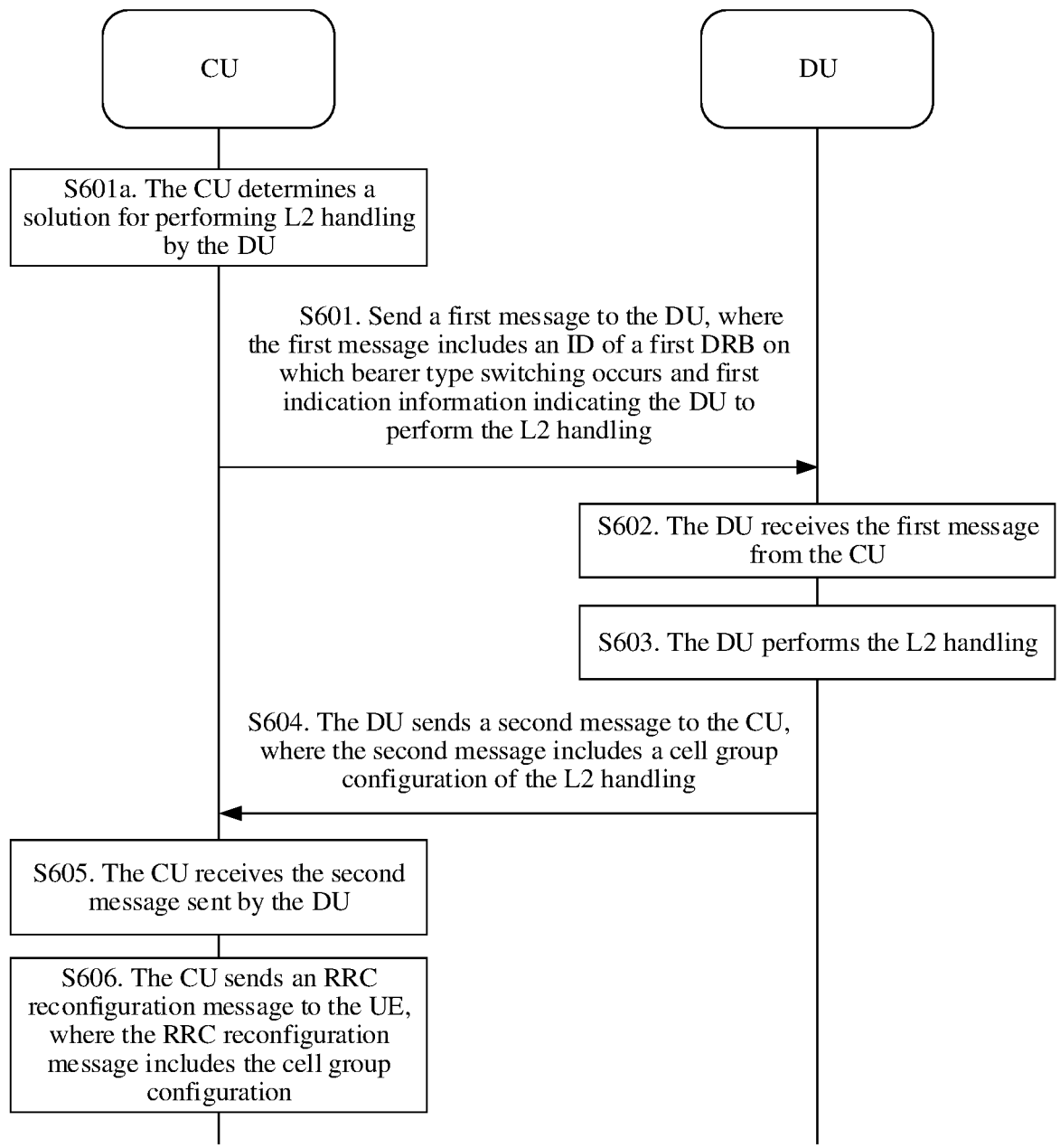
FIG. 7 is a schematic flowchart of another notification method according to an embodiment.

In the first case, as shown in FIG. 7, before S601, the notification method provided in this embodiment may further include S601a.

S601a. The CU determines a solution for performing the L2 handling by the DU.

Optionally, the CU may determine, from a set of solutions associated with the L2 handling, the specific operation of performing the L2 handling by the DU when the bearer type change occurs. The set of solutions associated with the L2 handling may be at least two predefined solutions associated with the L2 handling. It can be noted that specific content of the set of solutions associated with the L2 handling may be configured based on an actual requirement. This is not limited in this embodiment.

It can be noted that, when the notification method provided in this embodiment is performed, if there is S601a, the first case rather than the second case is involved in S601.

Optionally, in a possible implementation, the performing L2 handling may include: MAC reset and RLC re-establishment; change of LCID, and RLC re-establishment; MAC synchronous reconfiguration (MAC reset by reconfiguration with sync) and RLC re-establishment; or change of LCID, and RLC bearer release and add. For example, the performing L2 handling may include other specific operations of the L2 handling. This is merely an example for description, and is not a limitation on the embodiments.

It can be noted that "performing L2 handling includes" described in the embodiments may be understood as "specific operations of performing the L2 handling include". This is not described one by one in the following.

Optionally, in a possible implementation, the first message may further include an MCG indication, and the MCG indication is used to indicate that a base station in the CU-DU architecture is the MN in dual connectivity. Alternatively, the DU learns, in another manner, that a base station in the CU-DU architecture currently is the MN (that is, the first message does not include an explicit MCG indication). In this case, the performing L2 handling may include: the MAC reset and the RLC re-establishment; or the change of LCID and the RLC re-establishment.

The MCG indication may be an MCG character string, or another preconfigured character or bit. For example, an MCG/SCG indication includes an enumerated value MCG, or that an MCG/SCG indication=1 indicates an MCG. This is not limited in the embodiments. That the MCG/SCG indication=1 means that a value of a bit "MCG/SCG indication" is 1.

Optionally, in a possible implementation, the first message may further include an SCG indication, and the SCG indication is used to indicate that a base station in the CU-DU architecture is the SN in a dual connectivity architecture. Alternatively, the DU learns, in another manner, that a base station in the CU-DU architecture currently is the SN (that is, the first message does not include an explicit SCG indication). In this case, the performing L2 handling may include: the MAC synchronous reconfiguration and the RLC re-establishment; or the change of LCID and the RLC release and add.

The SCG indication may be an SCG character string, or another preconfigured character or bit. For example, an MCG/SCG indication includes an enumerated value SCG, or that an MCG/SCG indication=0 indicates an SCG. This is not limited in the embodiments. That the MCG/SCG indication=0 means that a value of a bit "MCG/SCG indication" is 0.

In a possible implementation, the set of solutions associated with the L2 handling may be Table A-1 defined in 3GPP TS 37.340 V15.2.0 or R2-1810953, where a name of the table is L2 handling for bearer type change with or without security key change (L2 handling for bearer type change with and without security key change). Content related to the L2 handling performed by the DU is shown in Table 1.

TABLE 1

| Bearer type change from row to col | MCG (with key change) | Split (with key change) | SCG (with key change) |
|---|---|---|---|
| MCG | PDCP: Re-establish<br>MCG RLC: Re-establish<br>MCG MAC: See Note 1<br>SCG RLC: No action<br>SCG MAC: No action | PDCP: Re-establish<br>MCG RLC: Re-establish<br>MCG MAC: See Note 1<br>SCG RLC: Establish<br>SCG MAC: Reconfigure | / |
| Split | PDCP: Re-establish<br>MCG RLC: See Note 1<br>MCG MAC: See Note 1<br>SCG RLC: Release<br>SCG MAC: Reconfigure | PDCP: Re-establish<br>MCG RLC: See Note 1<br>MCG MAC: See Note 1<br>SCG RLC: See Note 2<br>SCG MAC: See Note 2 | PDCP: Re-establish<br>MCG RLC: Re-establish + release<br>MCG MAC: Reconfigure<br>SCG RLC: See Note 2<br>SCG MAC: See Note 2 |
| SCG | / | PDCP: Re-establish<br>MCG RLC: Establish<br>MCG MAC: Reconfigure<br>SCG RLC: See Note 2<br>SCG MAC: See Note 2 | PDCP: Re-establish<br>MCG RLC: No action<br>MCG MAC: No action<br>SCG RLC: See Note 2<br>SCG MAC: See Note 2 |

Note 1:
For an MCG, the MAC/RLC behavior depends on the solution selected by the network. It can be "MAC reset + RLC re-establishment", or "change of LCID + RLC re-establishment".
Note 2:
For an SCG, the MAC/RLC behavior depends on the solution selected by the network. It can be "MAC reset by reconfiguration with sync + RLC re-establishment", or "change of LCID + RLC bearer release and add".

"With key change" indicates that the security key is updated. For example, when a node in which a PDCP entity of a bearer is located changes, or a PDCP entity of a bearer changes, for example, is switched from the MN to the SN, or is switched from the SN to the MN, the security key needs to be updated. An example in which change from the MCG bearer to the MCG bearer is performed and the security key is updated is used. One possibility is that a PDCP entity of the MCG bearer is originally located on the MN, and occupies the air interface resources on the MCG side. The PDCP of the MCG bearer is then switched to the SN, but still occupies the air interface resources on the MCG side. Another possibility is that a PDCP of the MCG bearer is originally located on the SN, and occupies the air interface resources on the MCG side. The PDCP of the MCG bearer is then switched to the MN, but still occupies the air interface resources on the MCG side.

Table 1 provides a corresponding solution associated with the L2 handling when a bearer type in a horizontal row is switched to a bearer type in a vertical column and the security key is updated. For example, during change from the split bearer to the SCG bearer, it is understood, by querying the third row and the fourth column in Table 1, that a solution that is associated with the L2 handling and that is of the bearer type change is that a PDCP layer performs re-establishment, an RLC layer of an MCG performs re-establishment and release, a MAC layer of the MCG performs reconfiguration, an RLC layer of an SCG performs L2 handling based on Note 2, and an MAC layer of the SCG performs L2 handling based on Note 2.

The first indication information is used to indicate a specific solution that is decided by the CU and that is used for performing the L2 handling by the DU. A type and content of the indication information may be configured based on an actual requirement. This is not limited in the embodiments. For example, the first indication information may be name information of the L2 handling. For example, a name of each solution associated with the L2 handling may be defined, and the solution name is used as the first indication information. Alternatively, the first indication information may be content information of the L2 handling. For example, content of the solution associated with the L2 handling may be used as the first indication information. Alternatively, the first indication information may be identification information of the L2 handling. For example, an identifier of each solution associated with the L2 handling may be configured, and the identifier is used as the first indication information. However, any information that may be used to indicate the specific solution associated with the L2 handling may be used as the first indication information.

For example, content shown in Table 1 is used as an example. It is assumed that the DU belongs to the SCG, and the L2 handling of the DU may include "MAC reset by reconfiguration with sync+RLC re-establishment" or "change of LCID+RLC bearer release and add". The first indication information may be implemented in the following several manners.

First implementation: solution content is used as the first indication information.

"MAC reset by reconfiguration with sync+RLC re-establishment" or "change of LCID+RLC bearer release and add" is used as the first indication information. That is, specific content of a solution is used as the indication information.

It can be noted that, when the solution content is used as the first indication information, the solution content may be complete content of the solution, or may be partial content of the solution, or may be abbreviated content of the solution. All content information that can explicitly indicate the solution may be used as the first indication information.

Second implementation: a solution name is used as the first indication information.

A name of "MAC reset by reconfiguration with sync+RLC re-establishment" is defined as a solution A, a name of "change of LCID+RLC bearer release and add" is defined as a solution B, and the "solution A" or the "solution B" is used as the first indication information.

Third implementation: a solution identity is used as the first indication information.

1-bit information is used to indicate the first indication information. 0 is used to identify "MAC reset by reconfiguration with sync+RLC re-establishment", 1 is used to identify "change of LCID+RLC bearer release and add", and 0 or 1 is used as the first indication information.

Fourth implementation: for a solution in which an implicit indication may be used, content of the implicit indication is used as the first indication information.

For example, for "change of LCID+RLC bearer release and add", the CU releases and adds a DRB by using a DRB to be released list field and a DRB to be added list field that are in a UE context modification request message. This is equivalent to a case in which the CU instructs the DU to release and add RLC entity. Therefore, an objective of notifying the DU is achieved.

In a second case, the first message includes the ID of the first DRB and the second indication information indicating that the bearer type change occurs.

The second indication information is used to notify the DU that the bearer type change occurs. A form and content of the second indication information may be configured based on an actual requirement. This is not limited in the embodiments. For example, the second indication information may be name information of a network operation of the bearer type change. For example, "bearer type change", "key change", or "bearer type change with key change" is used as the second indication information. Alternatively, the second indication information may be identification information of a network operation of the bearer type change. For example, a network identifier of the network operation of the bearer type change is defined in a network, and is used to uniquely indicate that the bearer type change occurs, and the network identifier is used as the first indication information. Any information that may be used to indicate that the network operation of the bearer type change occurs may be used as the second indication information.

In the second case, the CU indicates, to the DU, at least one DRB on which the bearer type change occurs. The DU autonomously makes a decision and performs a specific operation of the L2 handling when receiving the first message. For example, the DU may determine, from a set of solutions associated with the L2 handling, the specific operation of performing the L2 handling when the bearer type change occurs, and performs the corresponding L2 handling.

It can be noted that a case in which the DU makes a decision and performs the specific operation of the L2 handling after receiving the first message in the second case, and content of the L2 handling in the second case are the same as those described in the first case, except that execution bodies that make a decision are different. Detailed content has been described in detail in the first case, and details are not described herein again.

Further, optionally, during the bearer type change, an ID of a DRB on which the bearer type change occurs may be changed or may not be changed. This is not limited in this embodiment. When the bearer type change occurs, and the ID of the DRB on which the bearer type change occurs is changed, the first message may further include an ID of a second DRB, where the ID of the second DRB is used to replace the ID of the first DRB, to indicate the DU to perform corresponding L2 handling on at least the first DRB or the second DRB.

The first message is a CU-DU interface message. Currently, a CU-DU interface message in an NR network is defined as an F1 message. However, the CU-DU interface message may have another name. When network standards of the CU-DU architecture are different, different names may be defined for the interface message. This is not limited in the embodiments. For example, in an LTE network, an interface between a CU and a DU in a base station in a CU-DU architecture may be defined as a W1 interface, and a message transmitted on the W1 interface is referred to as a W1 message. For example, the first message may be a W1 message.

Optionally, the first message may be a currently existing CU-DU interface message, or the first message may be a newly defined message that is dedicated to instructing the DU to perform the L2 handling during the bearer type change. This is not limited in this embodiment either. For example, the first message may be a UE context modification request message, or a new first message is defined. For example, the newly defined first message may be a bearer type change notification message. Optionally, the ID of the first DRB and the first indication information that are included in the first message, or the ID of the first DRB and the second indication information that are included in the first message may be directly included in the first message and used as a field in the first message.

Optionally, the ID of the first DRB and the first indication information that are included in the first message, or the ID of the first DRB and the second indication information that are included in the first message may be included in a first field in the first message. The first field is any field in the first message.

Optionally, when the first message is an existing message, the first field may be an existing field in the existing message, or may be a newly defined field. This is not limited in this embodiment.

For example, when the first message is the UE context modification request message, the first field in the UE context modification request message includes the ID of the first DRB and the first indication information; or the first field in the UE context modification request message includes the ID of the first DRB and the second indication information. The first field may be an existing field in the UE context modification request message, or may be a newly defined field. This is not limited in this embodiment.

For example, when the first message is the UE context modification request message, the first field may include a DRB to Be Modified List field of the first DRB.

For example, when the first message is the UE context modification request message, and the first field is the DRB to Be Modified List field of the first DRB, content of the field may be:

DRB to Be Modified List
>DRB to Be Modified Item IEs
>>First DRB ID
>>First indication information (such as MAC reset/MAC reset reconfiguration with sync/RLC reestablish/change of LCID/RLC release and add) or second indication information (such as bearer type change/key change/bearer type change with key change).

Further optionally, if the first DRB is associated with more than one RLC entity (or LCID), the first message may further include an LCID that is associated with the bearer type change and that is in the first DRB, so that the DU performs L2 handling on an RLC entity or a logical channel corresponding to the LCID.

S602. The DU receives the first message from the CU.

The first message includes the ID of the first DRB on which the bearer type change occurs and the first indication information indicating the solution for performing the L2 handling by the DU. Alternatively, the first message includes the ID of the first DRB and the second indication information indicating that the bearer type change occurs.

It can be noted that the first message received by the DU from the CU in S602 is the first message sent by the CU in S601. The first message has been described in detail in S601, and details are not described herein again.

S603. The DU performs the L2 handling.

Thus, corresponding to the two cases of the first message in S601, processing manners in S603 are different.

Optionally, corresponding to the first case in S601, the DU performs the L2 handling based on an indication of the first indication information in S603. Corresponding to the second case in S601, the DU makes a decision and performs the L2 handling in S603.

That the DU makes a decision means that the DU determines, based on a network status, a specific operation for performing the L2 handling. An optional solution of the specific operation of the DU has been described in detail in the first case in S601, and details are not described herein again.

For example, based on content in Table 1, when the CU-DU architecture is used in the SN, the DU receives the first message, and learns that one of the following four cases occurs: (1) Split→Split with key change; (2) Split→SCG with key change; (3) SCG→Split with key change; and (4) SCG→SCG with key change. Then, the DU performs one of the following L2 handling based on the indication of the first indication information, or makes a decision and performs one of the following L2 handling based on the second indication information: (1) MAC reset reconfiguration with sync+RLC re-establishment; and (2) change of LCID+RLC bearer release and add.

"Split→Split with key change" indicates change from the split bearer to a split bearer with key change. For example, a PDCP anchor is changed from being on the MN to being on the SN, or a PDCP anchor is changed from being on the SN to being on the MN. Change of the PDCP anchor causes an update of the security key.

For example, based on the content in Table 1, when the CU-DU architecture is used in the MN, the DU receives the first message, and learns that one of the following cases occurs: (1) MCG→MCG with key change; (2) MCG→Split with key change; (3) Split→MCG with key change; and (4) Split→Split with key change. Then, the DU performs one of the following L2 handling based on the indication of the first indication information, or makes a decision and performs one of the following L2 handling based on the second indication information: (1) MAC reset+RLC re-establishment; and (2) change of LCID+RLC re-establishment.

It can be noted that, for a process in which the DU performs the L2 handling, for example, performs RLC layer and MAC layer configurations, the process is not described in detail in the embodiments. For details, refer to an existing mechanism.

For example, for a specific action of performing RLC re-establishment by the DU, refer to 3GPP TS 36.322 V15.1.0 or TS 38.322 V15.2.0, and an action varies with a mode. For example, when the RLC re-establishment is performed, for an RLC entity in a transparent mode, all RLC service data units (SDU) are deleted. For RLC release+add, a new LCID needs to be configured.

Optionally, when the first message further includes the ID of the second DRB, the DU further needs to perform the L2 handling on at least the first DRB or the second DRB.

The DU performs the L2 handling on at least the first DRB or the second DRB. This means that the DU performs a series of operations in the L2 handling, and an operation object may be one or both of the first DRB and the second DRB. For example, if the L2 handling performed by the DU is the RLC bearer release and add, the DU performs a release operation on the first DRB, and an add operation on the second DRB. The DU performs the L2 handling on at least the first DRB or the second DRB. This means that when performing the L2 handling, the DU associates all configurations related to the first DRB with the second DRB. When performing the change of LCID, the DU associates a changed LCID with the identifier of the second DRB. In addition, the DU further associates an F1 interface user plane tunnel associated with the identifier of the first DRB with the identifier of the second DRB.

S604. The DU sends a second message to the CU, where the second message includes a cell group configuration of the L2 handling.

For example, when performing the L2 handling, the DU needs to perform the RLC layer and MAC layer configurations. Specific content of the RLC layer and MAC layer configurations includes: generating the cell group configuration (CellGroupConfig) of the L2 handling. Information about the cell group configuration needs to be sent to UE via the CU, so that the UE performs a same configuration. For example, the DU sends the CellGroupConfig to the CU based on a UE context modification response message or a UE context modification required message.

It can be noted that the DU may first generate the cell group configuration including the L2 handling and then perform the L2 handling, or may first perform the L2 handling and then generate the cell group configuration including the L2 handling, or may simultaneously perform the L2 handling and generate the cell group configuration including the L2 handling. This is not limited in this embodiment.

For example, the CellGroupConfig may include RLC-config (an RLC configuration), RLC-BearerConfig (an RLC bearer configuration), MAC-CellGroupConfig (an MAC layer cell group configuration), and an LCID. The RLC-config includes a re-establishRlc field, and the RLC-BearerConfig includes LCID replacement indication information.

The LCID replacement indication information may be implemented implicitly. For example, an original LCID=1 corresponds to a DRB ID=1. Currently, an LCID=5 (used to replace the LCID=1) corresponds to the DRB ID=1. The UE can know change of LCID by comparing the LCIDs used before and after the replacement. The LCID replacement indication information may alternatively be implemented by adding a new IE, for example, by including a new LCID field in the RLC-BearerConfig. This is not limited in this embodiment.

For example, if the L2 handling performed by the DU is MAC reset by reconfiguration with sync+RLC re-establishment, the CellGroupConfig may further include reconfiguration with sync (synchronous reconfiguration), for example, a Reconfiguration with sync field. When the change of LCID is performed, the DU generates a new LCID that is bound to the ID of the first DRB. A binding relationship between an LCID and a DRB is represented based on a served radio bearer field in the RLC-BearerConfig. When the change of LCID is performed, and the CU indicates the ID of the second DRB, the DU generates an LCID, and associates the new LCID with the ID of the second DRB. When the RLC re-establishment is performed, information about a cell group configuration generated by the DU may include the re-establishRlc field. When the RLC release and add is performed, the information about the cell group configuration generated by the DU may include an RLC-bearer to release list and an RLC-bearer to add mod list.

Therefore, the DU sends the second message to the CU, to send the cell group configuration to the UE via the CU.

Optionally, if the first message is a request message in a request-response mechanism, the second message may be a response message of the first message. If the first message is a message in a non-request-response mechanism, the second message is an independent message. A type of the second message is not limited in the embodiments.

For example, the second message may be a response message of the UE context modification request message, and is referred to as the UE context modification response message.

S605. The CU receives the second message sent by the DU.

The second message includes the cell group configuration of the L2 handling.

It can be noted that the second message received by the CU from the DU in S605 is the second message sent by the DU in S604. The second message has been described in detail in S604, and details are not described herein again.

Further, as shown in FIG. 7, after S605, the notification method provided in this embodiment may further include S606.

S606. The CU sends an RRC reconfiguration message to the UE, where the RRC reconfiguration message includes the cell group configuration.

For example, after receiving the second message in S605, the CU adds, to the RRC reconfiguration message, a related configuration of L2 handling (for example, a PDCP layer configuration) for which the CU is responsible and the cell group configuration that is in the second message, and sends the RRC reconfiguration message to the UE, so that the UE performs a same configuration. A specific process is not described in detail.

According to the notification method provided, the CU notifies the DU of the ID of the first DRB on which the bearer type change occurs and the first indication information indicating the solution for performing the L2 handling by the DU. Alternatively, the CU notifies the DU of the ID of the first DRB, and notifies, based on the second indication information, the DU that the bearer type change occurs. In this way, the DU learns of a DRB on which the bearer type change occurs and the solution associated with the L2 handling. Alternatively, the DU learns of DRBs on which the bearer type change occurs. Therefore, the DU performs accurate and corresponding L2 handling, to perform an L2 configuration that adapts to the change of the communications link of the terminal device.

It can be noted that, in the foregoing implementation, the CU notifies the DU in a control plane. For example, the CU notifies the DU based on a control plane message of an F1 interface. In another possible implementation, the notification method provided in this embodiment may be implemented in a user plane. For example, the notification is implemented based on information carried in a data packet sent through a user plane tunnel of an F1 interface.

Thus, the user plane tunnel between the CU and the DU is at a DRB granularity or an LCID granularity. For example, when the CU and the DU perform carrier aggregation-based PDCP duplication, two user plane tunnels are established between the CU and the DU for one DRB. For example, the CU includes an ID of a DRB and corresponding CU side transport layer information in a UE context setup/modification request message, and the transport layer information may include at least a TEID (an identifier allocated to a tunnel) or a transport layer address. The DU includes the ID of the DRB and corresponding DU side transport layer information in a response message. TEIDs on CU and DU sides can uniquely identify one user plane tunnel, in other words, uniquely identify one DRB/LCID. In this implementation, the first message includes a TEID corresponding to the ID of the first DRB, and the first indication information. Alternatively, the first message includes a TEID corresponding to the ID of the first DRB, and the second indication information. For specific implementation, refer to specific implementation of the foregoing control plane. Details are not described herein again. In this case, the first message may be included in a downlink PDU. For example, a control field in the downlink PDU includes the interface TEID corresponding to the ID of the first DRB, and the first indication information, or includes the TEID corresponding to the ID of the first DRB, and the second indication information. Optionally, transport layer addresses on the CU and DU sides can uniquely identify one user plane tunnel, in other words, uniquely identify one DRB/LCID. In this case, the first message may include an interface transport layer address corresponding to an ID of a DRB.

A PDCP duplication mechanism is to replicate a PDCP PDU to obtain two PDCP PDUs, and then transmit the PDCP PDUs via two RLC entities. The PDCP duplication may be used in an SRB or a DRB.

When the CU sends a downlink data packet to the DU, a TEID is carried in a data packet header. When the data packet header carries the first indication information, a specific DRB/LCID associated with specific L2 handling is determined based on a binding relationship between a tunnel endpoint address TEID and a DRB/LCID. When the data packet header carries the second indication information, a DRB/LCID with bearer type change is determined based on a binding relationship between a tunnel endpoint address and a DRB/LCID.

According to still another aspect, an embodiment provides a notification method, used in a communication process that is between a CU and a DU in a CU-DU architecture and that exists when an RLC failure occurs. An operation that is performed by the CU/DU and that is described in the embodiments may be understood as being performed by the CU/DU, or may be understood as being performed by a functional unit or a chip in the CU/DU. This is not limited in this embodiment. The following only describes a case in which an operation is performed by the CU/DU. The functional unit or the chip that performs the notification method provided in this embodiment and that is in the CU/DU may be referred to as a communications apparatus in the embodiments.

Figure 8:
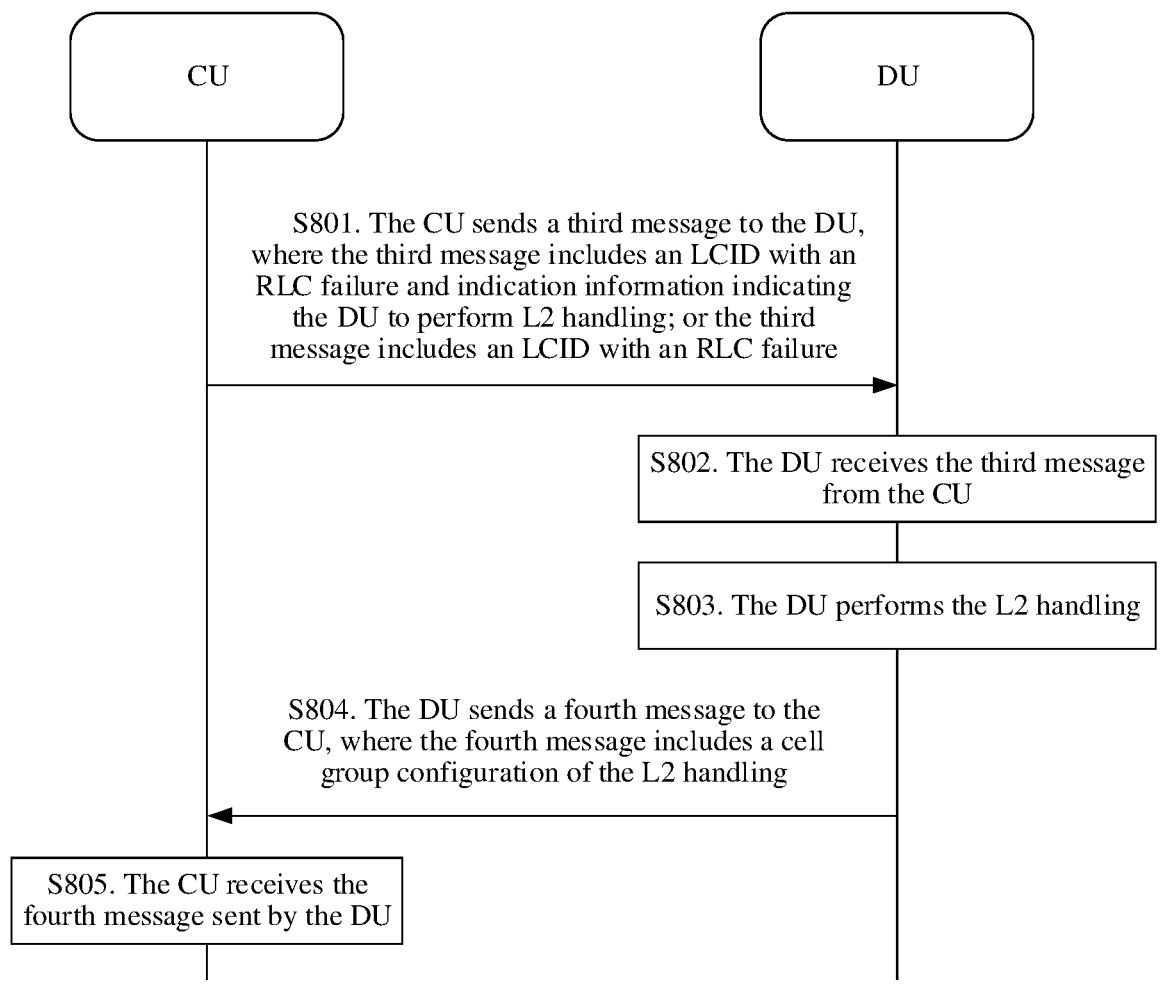
FIG. 8 is a schematic flowchart of still another notification method according to an embodiment.

As shown in FIG. 8, the notification method provided in this embodiment may include the following operations.

S801. The CU sends a third message to the DU, where the third message includes an LCID with the RLC failure and indication information indicating the DU to perform L2 handling; or the third message includes an LCID with the RLC failure.

It can be noted that there may be at least one LCID with the RLC failure. A quantity of LCIDs with the RLC failure is not limited in this embodiment. A process of performing a solution of this embodiment on each LCID with the RLC failure is the same.

S801 is performed when the CU determines that the RLC failure occurs. The CU may determine, based on information reported by UE, that the RLC failure occurs. For example, the CU determines, based on LCIDs included in an RRC message reported by the UE, LCIDs with the RLC failure. A base station or the CU may further determine, based on an MCG/SCG indication reported by the UE, whether the RLC failure occurs in an MCG or an SCG. When the base station in the CU-DU architecture serves as an MN, the CU may further notify, through an inter-base station interface such as an Xn/X2 interface, a secondary station SN of LCIDs with the RLC failure. For example, an Xn/X2 interface message includes an LCID with RLC failure list, and the list includes the LCIDs with the RLC failure.

It can be noted that the notification method provided in this embodiment is used after the CU determines that the RLC failure occurs. A process about how the CU determines that the RLC failure occurs is not limited, and details are not described herein.

For example, content of the third message in S801 includes the following two cases:

Case 1: The third message includes the LCID with the RLC failure and the indication information indicating the DU to perform the L2 handling.

In case 1, the CU determines a specific operation of performing the L2 handling by the DU when the RLC failure occurs, and notifies, based on the indication information, the DU of a specific operation of performing the L2 handling by the DU.

Figure 9:
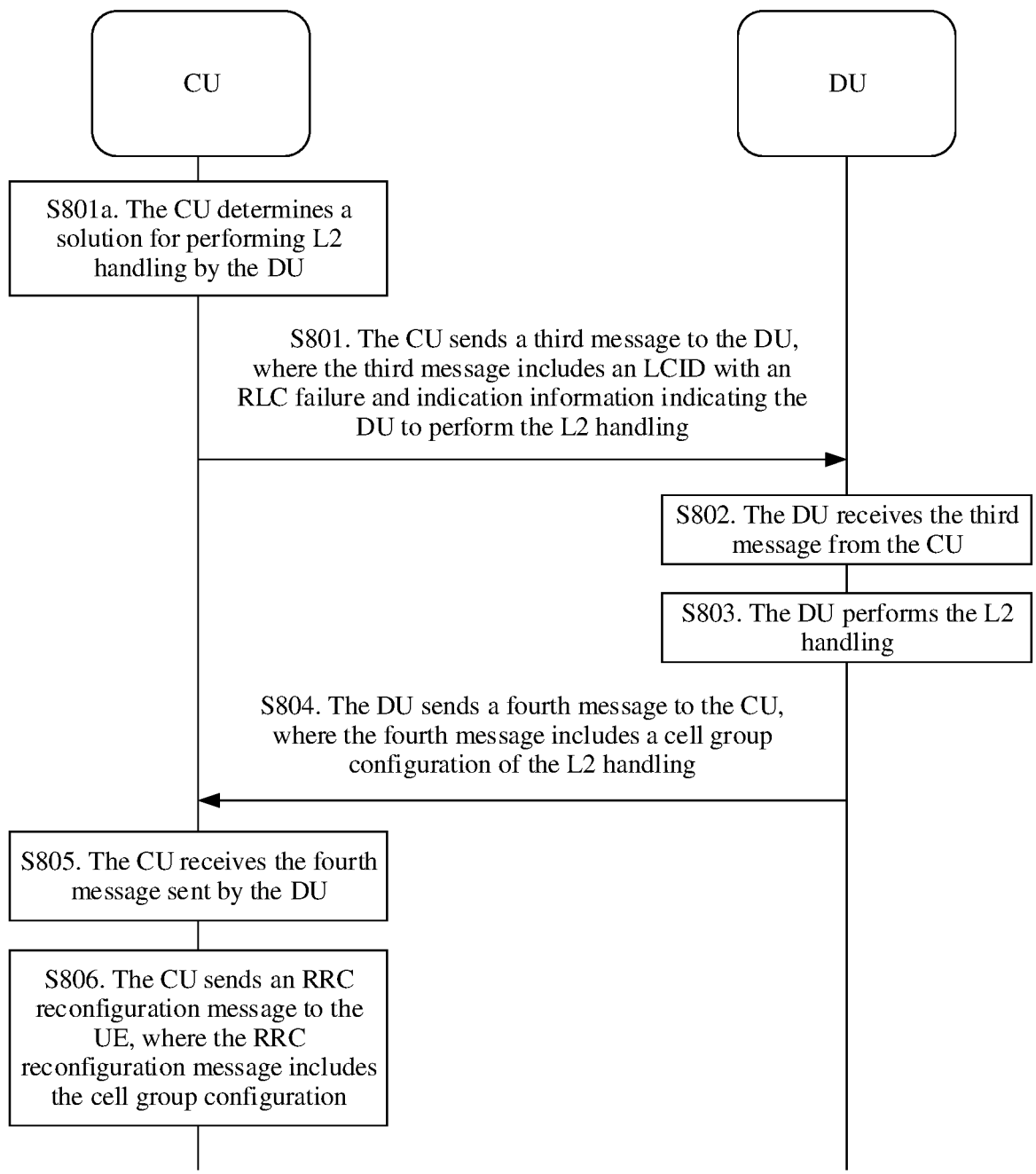
FIG. 9 is a schematic flowchart of yet another notification method according to an embodiment.

In case 1, as shown in FIG. 9, before S801, the notification method provided in this embodiment may further include S801a.

S801a. The CU determines a solution for performing the L2 handling by the DU.

Optionally, the CU may determine, from a set of solutions associated with the L2 handling, a specific operation of performing the L2 handling by the DU when the RLC failure occurs. The set of solutions associated with the L2 handling may be at least two predefined solutions associated with the L2 handling. It can be noted that specific content of the set of solutions associated with the L2 handling may be configured based on an actual requirement. This is not limited in this embodiment.

It can be noted that, when the notification method provided in the embodiments is performed, if there is S801a, case 1 rather than case 2 is involved in S801.

Optionally, in a possible implementation, when the RLC failure occurs, the performing L2 handling may include at least one of the following solutions: removing SCells corresponding to the LCID with the RLC failure, removing the LCID with the RLC failure, deactivating PDCP duplication, keeping PDCP duplication, deleting PDCP duplication, and RLC re-establishment. For example, when the RLC failure occurs, the performing L2 handling may include other specific operations of the L2 handling. This is merely an example, and is not a limitation on the content. Deactivating PDCP duplication means that a resource correspondence in a mode is kept but not enabled; in other words, a PDCP PDU replication operation is not performed. Keeping PDCP duplication means that the resource correspondence in the mode is maintained; in other words, the PDCP PDU replication operation continues to be performed. Deleting PDCP duplication means that the resource correspondence in the mode is deleted. For example, one RLC entity and one LCID that are associated with a DRB/SRB are removed, and only one RLC entity and one LCID are kept.

When the PDCP duplication is performed on the DRB/SRB, one DRB is associated with two RLC entities and two LCIDs, and a 3GPP standard requires that the two different LCIDs need to be scheduled in different serving cells. In an RRC reconfiguration message, a LogicalChannelConfig field includes an allowedServingCells field corresponding to one LCID. In this way, the UE may obtain a correspondence between the LCID and a serving cell. When all serving cells associated with the LCID are SCells, and a quantity of RLC retransmissions exceeds a maximum quantity, for the LCID, the RLC failure occurs. For the DRB, deactivating PDCP duplication may be implemented as follows: the UE may be instructed, based on a MAC control field, whether to activate or deactivate the PDCP duplication. In this case, one DRB still corresponds to two RLC entities and two LCIDs. Keeping PDCP duplication means that two RLC entities and two LCIDs corresponding to one DRB are kept. Deleting PDCP duplication means that a DRB is changed from corresponding to two RLC entities and two LCIDs to corresponding to only one RLC entity and one LCID. For the SRB, deactivating PDCP duplication may be implemented as follows: the DU is notified, via the CU, that a PDCP PDU does not need to be replicated. For example, the CU may set an execute duplication field included in an F1 interface message such as a downlink RRC message transfer to false, to notify the DU that the PDCP PDU does not need to be replicated.

For example, when the L2 handling is deleting PDCP duplication, the LCID with the RLC failure further needs to be removed. Optionally, when the PDCP duplication is performed on the DRB, the CU may determine whether to delete one of F1-U tunnels associated with a DRB corresponding to an LCID. For example, the CU may first learn of a mapping relationship between an ID of a DRB and an LCID based on the CellGroupConfig previously fed back by the DU, and then the CU finds the ID of the corresponding DRB based on the mapping relationship between an ID of a DRB and an LCID, and the LCID with the RLC failure reported by the UE. The CU may send a UE context modification request message. The DRB includes only one piece of transport layer information, for example, at least one TEID or one transport layer address, in the request message. After receiving the message, the DU may learn that the CU determines to delete one F1-U tunnel associated with the DRB, that is, delete PDCP duplication. Correspondingly, the DU generates a new CellGroupConfig, and the DRB is associated with only one LCID; for example, an LCID with the RLC failure that is associated with the DRB is removed. When the PDCP duplication is performed on the SRB, the CU may instruct the DU to remove one RLC entity and one LCID that correspond to the SRB. For example, the CU sets a duplication indication in an SRB to Be Modified List field in the UE context modification request message to false, and indicates the DU to remove the RLC entity corresponding to the corresponding SRB. Correspondingly, the DU further removes the LCID corresponding to the RLC entity, and generates a new CellGroupConfig. The SRB is associated with only one LCID; for example, the LCID with the RLC failure that is associated with the SRB is removed.

The indication information indicating the DU to perform the L2 handling is used to indicate a specific operation that is decided by the CU and that is of performing the L2 handling by the DU. A type and content of the indication information may be configured based on an actual requirement. This is not limited in the embodiments. For example, first indication information may be naming information of the L2 handling. For example, a name of each solution associated with the L2 handling may be defined, and the solution name is used as the indication information. Alternatively, the indication information may be content information of the L2 handling. For example, content of the solution associated with the L2 handling may be used as the indication information. Alternatively, the indication information may be identification information of the L2 handling. For example, an identifier of each solution associated with the L2 handling may be configured, and the identifier is used as the indication information. However, any information that may be used to indicate a specific solution associated with the L2 handling may be used as the indication information. This is not limited in this embodiment.

Optionally, the indication information indicating the DU to perform the L2 handling may include any one of the following indications: an indication about whether to keep the PDCP duplication; an indication about whether to delete the PDCP duplication; an indication about whether to remove the LCID with the RLC failure; an indication about whether to keep the LCID with the RLC failure; an indication of keeping the PDCP duplication; an indication of deleting the PDCP duplication; an indication of removing the LCID with the RLC failure; and an indication of keeping the LCID with the RLC failure. It should be noted that content of the indication information herein is merely described by using examples, and is not limited.

The indication about whether to keep the PDCP duplication is used to indicate a solution of keeping the PDCP duplication or deleting the PDCP duplication. When a value of the "indication about whether to keep the PDCP duplication" is yes, it indicates that the PDCP duplication is kept. When a value of the "indication about whether to keep the PDCP duplication" is no, it indicates that the PDCP duplication is deleted.

The indication about whether to delete the PDCP duplication is used to indicate a solution of keeping the PDCP duplication or deleting the PDCP duplication. When a value of the "indication about whether to delete the PDCP duplication" is yes, it indicates that the PDCP duplication is deleted. When a value of the "indication about whether to delete the PDCP duplication" is no, it indicates that the PDCP duplication is kept.

For example, a PDCP duplication field is added to the third message sent by the CU to the DU. The field is an enumeration type and includes two values: kept and not kept, which respectively indicate that the PDCP duplication is kept and that the PDCP duplication is not kept. Alternatively, the field is an integer and includes two values: 0 and 1, which respectively indicate that the PDCP duplication is kept and the PDCP duplication is not kept. It should be noted that a location of the PDCP duplication field in the third message is not limited.

The indication about whether to remove the LCID with the RLC failure is used to indicate a solution of removing the LCID or not removing the LCID. When a value of the "indication about whether to remove the LCID with the RLC failure" is yes, it indicates that the LCID is removed. When the value of the "indication about whether to remove the LCID with the RLC failure" is no, it indicates that the LCID is not removed.

The indication about whether to keep the LCID with the RLC failure is used to indicate a solution of removing the LCID or not removing the LCID. When a value of the "indication about whether to keep the LCID with the RLC failure" is yes, it indicates that the LCID is not removed. When the value of the "indication about whether to keep the LCID with the RLC failure" is no, it indicates that the LCID is removed.

Similarly, for example, a removal of LCID field is added. The field is an enumeration type and includes two values: true and false, which respectively indicate that the LCID is removed and that the LCID is kept. Alternatively, the field is an integer and includes two values: 0 and 1, which respectively indicate that the LCID is removed and that the LCID is kept.

Optionally, the indication information may be mandatory, and different content is indicated based on different values of the indication information. Alternatively, the indication information may be optional, and different content is indicated depending on whether there is the indication information.

Case 2: The third message includes only the LCID with the RLC failure.

In case 2, the CU indicates, to the DU, LCIDs with the RLC failure, and the DU performs a specific operation of the L2 handling. The DU autonomously makes a decision and performs the specific operation when receiving the third message.

It can be noted that a case in which the DU makes a decision and performs the specific operation of the L2 handling after receiving the third message in case 2, and content of the L2 handling in case 2 are the same as those described in case 1, except that execution bodies that make a decision are different. Detailed content has been described in detail in case 1, and details are not described herein again.

The third message is a CU-DU interface message. Currently, a CU-DU interface message in an NR network is defined as an F1 message. However, the CU-DU interface message may have another name. When network standards of the CU-DU architecture are different, different names may be further defined for the interface message. This is not limited in the embodiments. For example, in an LTE network, an interface between a CU and a DU in a base station in a CU-DU architecture may be defined as a W1 interface, and a message transmitted on the W1 interface is referred to as a W1 message. For example, the third message may be a W1 message.

Optionally, the third message may be a currently existing CU-DU interface message, or the third message may be a newly defined message that is dedicated to instructing the DU to perform the L2 handling when the RLC failure occurs. This is not limited in this embodiment either.

In a possible implementation, when the third message is the currently existing CU-DU interface message, the third message may be a UE context modification request message. When the third message is a newly defined F1 interface message or W1 interface message, the third message may be an RLC failure notification message.

Optionally, the LCID with the RLC failure and the indication information indicating the DU to perform the L2 handling that are included in the third message, or the LCID with the RLC failure that is included in the third message may be directly included in the third message and used as a field in the third message.

Optionally, the LCID with the RLC failure and the indication information indicating the DU to perform the L2 handling that are included in the third message, or the LCID with the RLC failure that is included in the third message may be included in a second field of the third message. The second field is any field in the third message.

Optionally, when the third message is an existing message, the second field may be an existing field in the existing message, or may be a newly defined field. This is not limited in this embodiment.

For example, when the third message is the UE context modification request message, the second field in the UE context modification request message includes the LCID with the RLC failure and the indication information indicating the DU to perform the L2 handling, or the LCID with the RLC failure. The second field may be an existing field in the UE context modification request message, or may be a newly defined field. This is not limited in this embodiment.

For example, when the third message is the UE context modification request message, the second field may include a newly defined LCID with RLC failure list field.

For example, when the third message is the UE context modification request message, and a first field is the newly defined LCID with RLC failure list field, content of the field may be:
LCID with RLC failure list
>LCID with RLC failure list IEs
>>LCID
>>PDCP duplication/removal of LCID/keep PDCP duplication/remove PDCP duplication/keep LCID/remove LCID (optional).

The field includes the LCID with the RLC failure. Optionally, the field may further include the indication about whether to keep the PDCP duplication, the indication about whether to remove the LCID, the indication about whether to keep the PDCP duplication, the indication of deleting the PDCP duplication, the indication of keeping the LCID, or the indication of removing the LCID.

For example, when the third message is the UE context modification request message, and the second field is a DRB to Be Modified List field of a DRB corresponding to the LCID with the RLC failure, content of the field may be:
DRB to Be Modified List
>DRB to Be Modified Item IEs
>>DRB ID
>>RLC failure or LCID with RLC failure
>>PDCP duplication/removal of LCID/keep PDCP duplication/remove PDCP duplication/keep LCID/remove LCID (optional).

It can be noted that when the second field is the DRB to Be Modified List field of the DRB corresponding to the LCID with the RLC failure, it is required that the CU can learn of the mapping relationship between an ID of a DRB and an LCID, find the ID of the corresponding DRB based on the LCID, and add an RLC failure indication. When the message includes the RLC failure indication, the DU needs to find a corresponding LCID based on the mapping relationship between an ID of a DRB and an LCID, to learn that for the LCID, the RLC failure occurs. When the message includes the LCID with RLC failure, the DU may directly learn that for which LCID, the RLC failure occurs.

For example, when the third message is the UE context modification request message, and the second field is an SRB to Be Modified List field of an SRB corresponding to the LCID with the RLC failure, content of the field may be:
SRB to Be Modified List
>SRB to Be Modified Item IEs
>>SRB ID
>>RLC failure or LCID with RLC failure
>>PDCP duplication/removal of LCID/keep PDCP duplication/remove PDCP duplication/keep LCID/remove LCID (optional).

It can be noted that when the second field is the SRB to Be Modified List field of the SRB corresponding to the LCID with the RLC failure, it is required that the CU can learn of a mapping relationship between an ID of an SRB and an LCID, find an ID of a corresponding SRB based on an LCID, and add an RLC failure indication. When the message includes the RLC failure indication, the DU needs to find a corresponding LCID based on the mapping relationship between an ID of an SRB and an LCID, to learn that for the LCID, the RLC failure occurs. When the message includes the LCID with RLC failure, the DU may directly learn that for which LCID, the RLC failure occurs.

For example, when the third message is the UE context modification request message, and the L2 handling is removing SCells corresponding to the LCID with the RLC failure, the second field may be a secondary cell to be removed list in the UE context modification request message. For example, the CU learns of a mapping relationship between an LCID and a secondary cell by reading a cell group configuration provided by the DU, for example, by reading an allowedServingCells field corresponding to an LCID. The CU finds a corresponding secondary cell based on an LCID. The CU adds the secondary cell to be removed list to the UE context modification request message. The secondary cell to be removed list includes SCells corresponding to the LCID with the RLC failure.

Further, optionally, the third message may further include new SCells provided by the CU, to replace the SCells corresponding to the LCID with the RLC failure.

For example, the new SCells may be provided based on an existing SCell to be added list field, or may be provided in another manner. This is not limited in this embodiment.

S802. The DU receives the third message from the CU.

The third message includes the LCID with the RLC failure and the indication information indicating the DU to perform the L2 handling. Alternatively, the third message includes the LCID with the RLC failure.

It can be noted that the third message received by the DU from the CU in S802 is the third message sent by the CU in S801. The third message has been described in detail in S801, and details are not described herein again.

S803. The DU performs the L2 handling.

For example, corresponding to the two cases of the third message in S801, processing manners in S803 are different.

Optionally, corresponding to case 1 in S801, the DU performs the L2 handling based on an indication of the indication information in S803. Corresponding to case 2 in S801, the DU makes a decision and performs the L2 handling in S803.

That the DU makes a decision means that the DU determines, based on a network status, a specific operation for performing the L2 handling. An optional solution of the specific operation of the DU has been described in detail in case 1 in S801, and details are not described herein again.

Further optionally, corresponding to case 2 in S801, after the DU makes a decision and performs the L2 handling in S803, the DU further needs to notify the CU of content of the L2 handling decided by the DU.

For example, it is assumed that the L2 handling is that the DU removes the SCells corresponding to the LCID with the RLC failure. To be specific, the CU learns, based on the third message, of LCIDs with the RLC failure. This implies that the DU needs to remove the SCells corresponding to the LCIDs with the RLC failure. In addition, the DU may further decide whether to keep the PDCP duplication. The DU notifies the CU of a decision result. For example, the DU sends a notification message to the CU. The notification message may include the indication about whether to delete the PDCP duplication, the indication of deleting the PDCP duplication, the indication about whether to keep the PDCP duplication, or the indication of keeping the PDCP duplication. For example, the DU may also need to notify the CU only when the DU determines to delete the PDCP duplication. The notification message may include the indication about whether to delete the PDCP duplication, or the indication of deleting the PDCP duplication. In this way, the CU deletes, from a PDCP configuration, configuration information related to the PDCP duplication. Alternatively, the DU may further decide whether to remove the LCID with the RLC failure. When the DU determines whether to remove the LCID with the RLC failure, or determines to remove the LCID with the RLC failure, the DU notifies the CU of a decision result. A notification method is similar to that of instructing the CU whether to delete the PDCP duplication or instructing the CU to delete the PDCP duplication. Details are not described herein again.

It can be noted that, for a process in which the DU performs the L2 handling, to be specific, performs RLC layer and MAC layer configurations, the process is not described in detail in the embodiments. For details, refer to an existing mechanism.

Further, optionally, when the DU performs the L2 handling to remove the SCells, SCell allocation further needs to be performed. In a possible implementation, existing SCells are reallocated. A possibility is that the existing SCells and new SCells provided by the CU are reallocated together. This is not limited in this embodiment.

Further, optionally, the third message may further include the new SCells provided by the CU, to replace SCells corresponding to the LCID with the RLC failure.

For example, it is assumed that a DRB 1 corresponds to an LCID 1 and an LCID 2, where the RLC failure occurs in an RLC entity corresponding to the LCID 2, and it is assumed that the new SCells provided by the CU are 6 and 7. SCell allocation performed by the DU is shown in Table 2.

TABLE 2

| LCID | Original SCell Allocation | New SCell Allocation (The CU does not provide new SCells) | New SCell Allocation (The CU provides new SCells) |
|---|---|---|---|
| LCID 1 | SCells 1, 2 | SCell 1 | SCells 1, 6 |
| LCID 2 | SCell 3 | SCell 2 | SCells 2, 7 |
| LCID 3 | SCells 4, 5 | SCells 4, 5 | SCells 4, 5 |

S804. The DU sends a fourth message to the CU, where the fourth message includes a cell group configuration of the L2 handling.

For example, the DU performs the L2 handling, and performs the RLC layer and MAC layer configurations. Specific content of the RLC layer and MAC layer configurations includes: generating a cell group configuration (CellGroupConfig). The cell group configuration needs to be sent to the UE via the CU, so that the UE performs a same configuration. Therefore, the DU sends the second message to the CU, to send the cell group configuration to the UE via the CU.

Optionally, if the third message is a request message in a request-response mechanism, the fourth message may be a response message of the third message. If the third message is a message in a non-request-response mechanism, the fourth message is an independent message. A type of the fourth message is not limited in the embodiments.

For example, the fourth message may include a response message of the UE context modification request message.

S805. The CU receives the fourth message sent by the DU.

The fourth message includes the cell group configuration of the L2 handling.

It can be noted that the fourth message received by the CU from the DU in S805 is the fourth message sent by the DU in S804. The fourth message has been described in detail in S804, and details are not described herein again.

Further, as shown in FIG. 9, after S805, the notification method provided in this embodiment of the embodiments may further include S806.

S806. The CU sends the RRC reconfiguration message to the UE, where the RRC reconfiguration message includes the cell group configuration.

For example, after receiving the fourth message in S805, the CU adds, to the RRC reconfiguration message, a related configuration of the L2 handling (for example, a PDCP layer configuration) for which the CU is responsible and the cell group configuration that is in the fourth message, and sends the RRC reconfiguration message to the UE, so that the UE performs a same configuration. A specific process is not described in detail.

According to the notification method provided in the embodiments, the DU obtains, from the CU, the LCID with the RLC failure and the indication information indicating the solution for performing the L2 handling. Alternatively, the DU obtains, from the CU, the LCID with the RLC failure, and determines that the RLC failure occurs. In this way, the DU learns of the LCID with the RLC failure and the solution associated with the L2 handling. Alternatively, the DU learns of LCIDs with the RLC failure. Therefore, the DU performs accurate and corresponding L2 handling, to perform an L2 configuration that adapts to change of a communications link of a terminal device.

It can be noted that, in the foregoing implementation, the CU notifies the DU in a control plane. In another possible implementation, the notification method provided in the embodiments may be implemented in a UP.

For example, a user plane tunnel between the CU and the DU is at a DRB granularity or an LCID granularity. For example, when the CU and the DU perform carrier aggregation-based PDCP duplication, two F1-U tunnels are established between the CU and the DU for one DRB. For example, the CU includes an ID of a DRB and corresponding CU side transport layer information in a UE context setup/modification request message, and the transport layer information may include at least a TEID or a transport layer address. The DU includes the ID of the DRB and a corresponding DU side TEID in a response message. TEIDs on CU and DU sides can uniquely identify one user plane tunnel, in other words, uniquely identify one DRB/LCID. Optionally, transport layer addresses on the CU and DU sides can uniquely identify one user plane tunnel, in other words, uniquely identify one DRB/LCID. In this case, the third message may include a transport layer address corresponding to the ID of the DRB. In this implementation, the third message includes a TEID corresponding to the LCID with the RLC failure, the RLC failure indication, and the indication information indicating the DU to perform the L2 handling. Alternatively, the third message includes a TEID corresponding to the LCID with the RLC failure, and the indication information indicating the DU to perform the L2 handling. Alternatively, the third message includes a TEID corresponding to the LCID with the RLC failure, and the RLC failure indication. For specific implementation, refer to specific implementation of the foregoing control plane. Details are not described herein again. When the CU sends a downlink data packet to the DU, a TEID is carried in a data packet header. When the data packet header carries the RLC failure indication, an LCID with the RLC failure is determined based on a binding relationship between a tunnel endpoint address and an LCID. When the data packet header carries the RLC failure indication and the indication information indicating the DU to perform the L2 handling, an LCID with the RLC failure and specific L2 handling that needs to be performed are determined based on a binding relationship between a tunnel endpoint address and an LCID. When the data packet header carries the indication information indicating the DU to perform the L2 handling, specific L2 handling that needs to be performed for an LCID is determined based on a binding relationship between a tunnel endpoint address and an LCID.

The foregoing mainly describes the solutions provided in the embodiments from a perspective of working processes of the CU and the DU. It can be understood that to achieve the foregoing functions, the CU and the DU include corresponding hardware structures or software modules for performing the various functions. Persons of ordinary skill in the art should be aware that, in combination with the examples described in the embodiments disclosed in the embodiments, units and algorithm operations may be implemented by hardware or a combination of hardware and computer software in the embodiments. Whether a function is performed by hardware or hardware driven by computer software depends on particular applications and design constraints of the technical solutions. Persons of ordinary skill in the art may use different methods to implement a described function for each particular application, but it should not be considered that the implementation goes beyond the scope of the embodiments.

It can be noted that a function part that is of the CU or the DU and that is used to perform the notification method provided in the embodiments is referred to as a communications apparatus. It may be understood that the communications apparatus may be a part or all of the CU or the DU. For example, the communications apparatus may be equivalent to the CU or the DU, or the communications apparatus may alternatively be deployed in the CU or the DU, to support the CU or the DU in performing the notification method provided in the embodiments.

In the embodiments, functional modules of the CU and the DU may be obtained through division based on the foregoing method examples. For example, various functional modules may be obtained through division based on various corresponding functions, or two or more functions may be integrated into one processing module. The integrated module may be implemented in a form of hardware, or may be implemented in a form of a software functional module. It can be noted that in the embodiments, division into the modules is an example and is merely logical function division, and may be other division during actual implementation. When the communications apparatus is a part or all of the CU or the DU, dividing the CU or the DU into functional modules is equivalent to dividing the communications apparatus into functional modules. Alternatively, when the communications apparatus is a part or all of the CU or the DU, dividing the communications apparatus into functional modules is equivalent to dividing the CU or the DU into functional modules.

Figure 10:
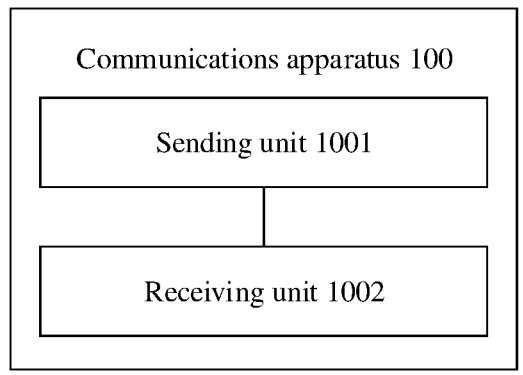
FIG. 10 is a schematic structural diagram of a communications apparatus according to an embodiment.

When each functional module is obtained through division based on each corresponding function, FIG. 10 is a possible schematic structural diagram of a communications apparatus 100 in the CU in the foregoing embodiments. The communications apparatus 100 may include a sending unit 1001 and a receiving unit 1002. The sending unit 1001 is configured to perform the processes S601 and S606 in FIG. 6 or FIG. 7, or perform the processes S801 and S806 in FIG. 8 or FIG. 9. The receiving unit 1002 is configured to perform the process S605 in FIG. 6 or FIG. 7, or perform the process S805 in FIG. 8 or FIG. 9. All related content of the operations in the foregoing method embodiments may be cited in function descriptions of corresponding functional modules. Details are not described herein again.

Figure 11:
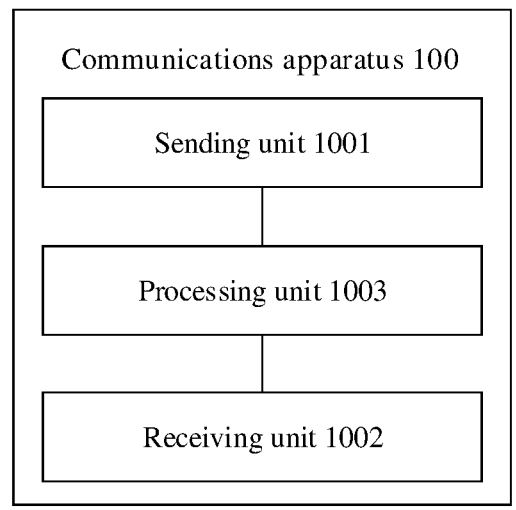
FIG. 11 is a schematic structural diagram of another communications apparatus according to an embodiment.

Further, as shown in FIG. 11, the communications apparatus 100 may further include a processing unit 1003. The processing unit 1003 is configured to perform the process S601a in FIG. 6 or FIG. 7, or perform the process S801a in FIG. 8 or FIG. 9.

Figure 12:
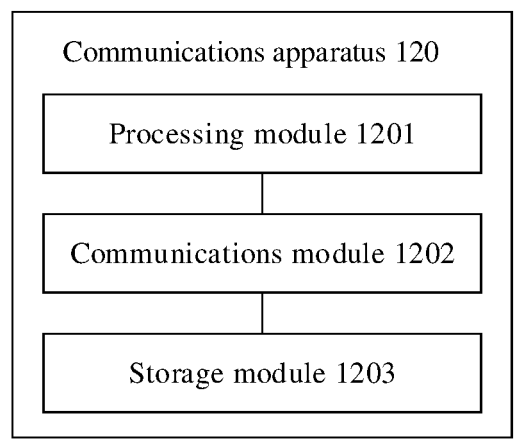
FIG. 12 is a schematic structural diagram of still another communications apparatus according to an embodiment.

When an integrated unit is used, FIG. 12 is a possible schematic structural diagram of a communications apparatus 120 in the CU in the foregoing embodiments. The communications apparatus 120 may include a processing module 1201 and a communications module 1202. The processing module 1201 is configured to control and manage an action of the communications apparatus 120. For example, the processing module 1201 is configured to support, via the communications module 1202, the communications apparatus 120 in performing the processes S601, S605, and S606 in FIG. 6 or FIG. 7, or performing the processes S801, S805, and S806 in FIG. 8 or FIG. 9. The processing module 1201 is configured to support the communications apparatus 120 in performing the process S601a in FIG. 6 or FIG. 7, or performing the process S801a in FIG. 8 or FIG. 9. The communications apparatus 120 may further include a storage module 1203, configured to store program code and data that are of the communications apparatus 120.

When the communications apparatus 120 is deployed in the CU, the processing module 1201 may be the processor 401 in a physical structure of the CU 40 shown in FIG. 4, and may be a processor or a controller. For example, the processing module may be a CPU, a general purpose processor, a DSP, an ASIC, an FPGA or another programmable logic device, a transistor logic device, a hardware component, or any combination thereof. The processing module 1201 may implement or execute various example logical blocks, modules, and circuits described with reference to content disclosed in the embodiments. The processing module 1201 may alternatively be a combination implementing a computing function, for example, a combination including one or more microprocessors, or a combination of a DSP and a microprocessor. The communications module 1202 may be the transceiver 403 in the physical structure of the CU 40 shown in FIG. 4. The communications module 1202 may be a communications port, or may be a transceiver, a transceiver circuit, a communications interface, or the like. Alternatively, the communications interface may communicate with another device via the foregoing element that has receiving and sending functions. The foregoing element that has receiving and sending functions may be implemented via an antenna or a radio frequency apparatus. The storage module 1203 may be the memory 402 in the physical structure of the CU 40 shown in FIG. 4.

When the processing module 1201 is the processor, the communications module 1202 is the transceiver, and the storage module 1203 is the memory, the communications apparatus 120 in FIG. 12 in this embodiment may be a part or all of the CU 40 shown in FIG. 4.

As described above, the communications apparatus 100 or the communications apparatus 120 provided in the embodiments may be configured to implement functions of the CU in the methods implemented in the foregoing embodiments. For ease of description, only a part related to the embodiments is shown, and for specific technical details that are not disclosed, refer to the embodiments.

Figure 13:
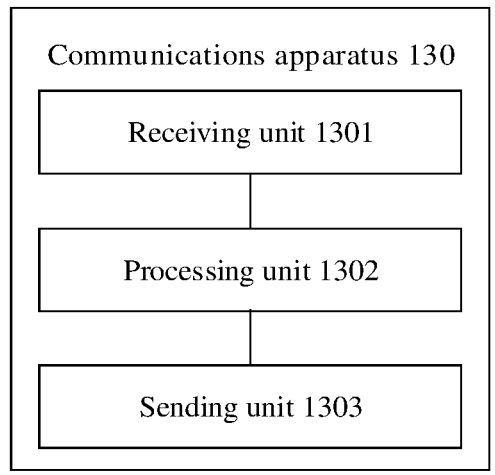
FIG. 13 is a schematic structural diagram of yet another communications apparatus according to an embodiment.

When each functional module is obtained through division based on each corresponding function, FIG. 13 is a possible schematic structural diagram of a communications apparatus 130 in the DU in the foregoing embodiments. The communications apparatus 130 may include a receiving unit 1301, a processing unit 1302, and a sending unit 1303. The receiving unit 1301 is configured to perform the process S602 in FIG. 6 or FIG. 7, or perform the process S802 in FIG. 8 or FIG. 9. The processing unit 1302 is configured to perform the process S603 in FIG. 6 or FIG. 7, or perform the process S803 in FIG. 8 or FIG. 9. The sending unit 1303 is configured to perform the process S604 in FIG. 6 or FIG. 7, or perform the process S804 in FIG. 8 or FIG. 9. All related content of the operations in the foregoing method embodiments may be cited in function descriptions of corresponding functional modules. Details are not described herein again.

Figure 14:
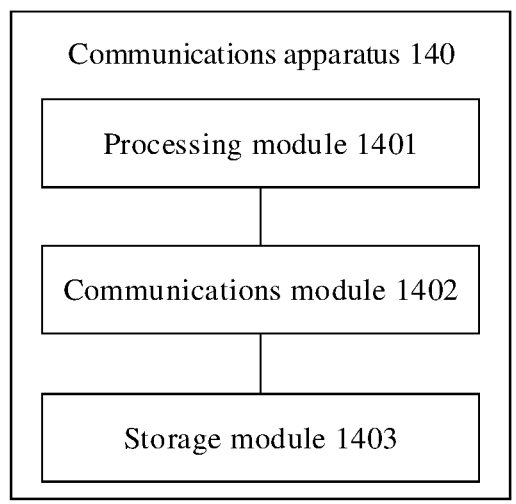
FIG. 14 is a schematic structural diagram of yet another communications apparatus according to an embodiment.

When an integrated unit is used, FIG. 14 is a possible schematic structural diagram of a communications apparatus 140 in the DU in the foregoing embodiments. The communications apparatus 140 may include a processing module 1401 and a communications module 1402. The processing module 1401 is configured to control and manage an action of the communications apparatus 140. For example, the processing module 1401 is configured to support, via the communications unit 1402, the communications apparatus 140 in performing processes S602 and S604 in FIG. 6 or FIG. 7, or performing processes S802 and S804 in FIG. 8 or FIG. 9. The processing module 1401 is configured to support the communications apparatus 140 in performing the process S603 in FIG. 6 or FIG. 7, or performing the process S803 in FIG. 8 or FIG. 9. The communications apparatus 140 may further include a storage module 1403, configured to store program code and data that are of the communications apparatus 140.

When the communications apparatus 140 is deployed in the DU, the processing module 1401 may be the processor 501 in a physical structure of the DU 50 shown in FIG. 5, and may be a processor or a controller. For example, the processing module may be a CPU, a general purpose processor, a DSP, an ASIC, an FPGA or another programmable logic device, a transistor logic device, a hardware component, or any combination thereof. The processing module 1401 may implement or execute various example logical blocks, modules, and circuits described with reference to content disclosed in the embodiments. The processor 1401 may alternatively be a combination implementing a computing function, for example, a combination including one or more microprocessors, or a combination of a DSP and a microprocessor. The communications module 1402 may be the transceiver 503 in the physical structure of the DU 50 shown in FIG. 5. The communications module 1402 may be a communications port, or may be a transceiver, a transceiver circuit, a communications interface, or the like. Alternatively, the communications interface may communicate with another device via the foregoing element that has receiving and sending functions. The foregoing element that has receiving and sending functions may be implemented via an antenna or a radio frequency apparatus. The storage module 1403 may be the memory 502 in the physical structure of the DU 50 shown in FIG. 5.

When the processing module 1401 is the processor, the communications module 1402 is the transceiver, and the storage module 1403 is the memory, the communications apparatus 140 in FIG. 14 in this embodiment may be a part or all of the DU 50 shown in FIG. 5.

As described above, the communications apparatus 130 or the communications apparatus 140 provided in the embodiments may be configured to implement functions of the DU in the methods implemented in the foregoing embodiments. For ease of description, only a part related to this embodiment is shown, and for specific technical details that are not disclosed, refer to the embodiments.

According to still another aspect, an embodiment provides a communications system, including the CU described in any one of the foregoing embodiments about bearer type change and the DU described in any one of the foregoing embodiments about the bearer type change.

According to still another aspect, an embodiment provides a communications system, including the CU described in any one of the foregoing embodiments about RLC failure and the DU described in any one of the foregoing embodiments about the RLC failure.

The method or algorithm operations described with reference to the content disclosed in the embodiments may be implemented by hardware, or may be implemented by a processor by executing a software instruction. The software instruction may include a corresponding software module. The software module may be stored in a RAM, a flash memory, a ROM, an erasable programmable read-only memory (EPROM), an electrically erasable programmable read-only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. It may further be understood that the storage medium may be a component of the processor. The processor and the storage medium may be located in an ASIC. In addition, the ASIC may be located in a core network interface device. For example, the processor and the storage medium may exist in the core network interface device as discrete components. Alternatively, the memory may be coupled to the processor. For example, the memory may exist independently, and is connected to the processor by using a bus. The memory may alternatively be integrated with the processor. The memory may be configured to store application program code for executing the technical solutions provided in the embodiments of the embodiments, and the processor controls the execution. The processor is configured to execute the application program code stored in the memory, to implement the technical solutions provided in the embodiments.

An embodiment further provides a chip system. The chip system includes a processor, configured to implement the technical methods of a communications device in the embodiments of the present invention. In a possible design, the chip system further includes a memory, configured to store at least a program instruction or data that are/is necessary for the communications device in the embodiments. In a possible implementation, the chip system further includes a memory, configured to enable the processor to invoke application program code stored in the memory. The chip system may include one or more chips, or may include a chip and another discrete device. This is not limited in the embodiments.

It may be clearly understood by persons of ordinary skill in the art that, for convenient and brief description, for a detailed working process of the foregoing system, apparatus, and unit, refer to a corresponding process in the foregoing method embodiments, and details are not described herein again.

Persons of ordinary skill in the art can be aware that in the foregoing one or more examples, functions described in the embodiments may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible to a general purpose or dedicated computer. It may be clearly understood by persons of ordinary skill in the art that, for convenient and brief description, for a detailed working process of the foregoing system, apparatus, and unit, refer to a corresponding process in the foregoing method embodiments, and details are not described herein again.

In the several embodiments provided, it can be understood that the disclosed system, apparatus, and method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate components may or may not be physically separate, and components displayed as units may or may not be physical units, and may be located at one position, or may be distributed on a plurality of network units. Some or all of the units may be selected based on an actual requirement to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of hardware combined with a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the operations of the methods described in the embodiments. The foregoing storage medium includes: any medium that can store program code, for example, a USB flash drive, a removable hard disk, a read-only memory (ROM), a random access memory (RAM), a magnetic disk, or an optical disc.

Finally, it can be noted that the foregoing embodiments are merely intended to describe technical solutions, but are non-limiting. Although the embodiments are described in detail, persons of ordinary skill in the art should understand that they may still make modifications to the technical solutions described in the foregoing embodiments or make equivalent replacements to some technical features thereof, without departing from the scope of the technical solutions of the embodiments.

What is claimed is:

1. A notification method, performed by a central unit (CU) in a CU-distributed unit (DU) architecture, the notification method comprising:
sending, by the CU, a first message to the DU, wherein the first message comprises an identifier (ID) of a first data radio bearer (DRB) on which a bearer type change occurs and indication information indicating that the bearer type change occurs; wherein the bearer type of the first DRB changes between any two of the following bearer types: a master node (MN) terminated mater cell group (MCG) bearer, a MN terminated secondary cell group (SCG) bearer, a MN terminated split bearer, a secondary node (SN) terminated MCG bearer, a SN terminated SCG bearer, a SN terminated split bearer, wherein the MCG bearer is a data-plane radio bearer that occupies only air interface resources on an MCG side, the SCG bearer is a data-plane radio bearer that occupies only air interface resources on an SCG side, the split bearer is a data-plane radio bearer that occupies air interface resources on the MCG and SCG sides and that is served by the MN and the SN, the MN terminated indicates a packet data convergence protocol (PDCP) entity in the MN, and the SN terminated indicates a PDCP entity in the SN; and
receiving, by the CU, a second message sent by the DU, wherein the second message comprises a cell group configuration of a layer 2 (L2) handling.

2. The notification method according to claim 1, wherein performing of the L2 handling further comprises:
media access control (MAC) layer resetting and radio link control (RLC) layer re-establishment;
changing of a logical channel identifier (LCID), and RLC re-establishment;
MAC synchronous reconfiguration and RLC re-establishment; or
changing of LCID, and RLC bearer release and add.

3. The notification method according to claim 1, wherein the first message further comprises a master cell group (MCG) indication, and performing of the L2 handling further comprises:
MAC resetting and RLC re-establishment; or
changing of LCID, and the RLC re-establishment.

4. The notification method according to claim 1, wherein the first message further comprises a secondary cell group (SCG) indication, and performing of the L2 handling further comprises:
MAC synchronous reconfiguration and RLC re-establishment; or
changing of LCID, and the RLC bearer release and add.

5. The notification method according to claim 1, wherein the first message further comprises:
an ID of a second DRB, wherein the ID of the second DRB is used to replace the ID of the first DRB.

6. The notification method according to claim 1, wherein the first message is a user equipment (UE) context modification request message, the second message is a UE context modification response message.

7. The notification method according to claim 1, wherein the indication information is the bearer type change.

8. A notification method, performed by a distributed unit (DU) in a central unit (CU)-DU architecture, the notification method comprising:
receiving, by the DU, a first message from the CU, wherein the first message comprises an identifier (ID) of a first data radio bearer (DRB) on which a bearer type change occurs and indication information indicating that the bearer type change occurs, wherein the bearer type of the first DRB changes between any two of the following bearer types: a master node (MN) terminated mater cell group (MCG) bearer, a MN terminated secondary cell group (SCG) bearer, a MN terminated split bearer, a secondary node (SN) terminated MCG bearer, a SN terminated SCG bearer, and a SN terminated split bearer, wherein the MCG bearer is a data-plane radio bearer that occupies only air interface resources on an MCG side, the SCG bearer is a data-plane radio bearer that occupies only air interface resources on an SCG side, the split bearer is a data-plane radio bearer that occupies air interface resources on the MCG and SCG sides and that is served by the MN and the SN, the MN terminated indicates a packet data convergence protocol (PDCP) entity in the MN, and the SN terminated indicates a PDCP entity in the SN;

performing, by the DU, a layer 2 (L2) handling; and sending, by the DU, a second message to the CU, wherein the second message comprises a cell group configuration of the L2 handling.

9. The notification method according to claim 8, wherein when the first message comprises the ID of the first DRB and the indication information, performing, by the DU, the L2 handling further comprises:

making, by the DU, a decision, and performing the L2 handling.

10. The notification method according to claim 8, wherein the solution for performing the L2 handling further comprises:

media access control (MAC) layer resetting and radio link control (RLC) layer re-establishment;

changing of a logical channel identifier (LCID), and RLC re-establishment;

MAC synchronous reconfiguration and RLC re-establishment; or changing of LCID, and RLC bearer release and add.

11. The notification method according to claim 8, wherein the first message further comprises a master cell group (MCG) indication, and the solution for performing the L2 handling further comprises:

MAC resetting and RLC re-establishment; or the changing of LCID, and the RLC re-establishment.

12. The notification method according to claim 8, wherein the first message further comprises a secondary cell group (SCG) indication, and the solution for performing the L2 handling further comprises:

MAC synchronous reconfiguration and RLC re-establishment; or the changing of LCID, and the RLC bearer release and add.

13. The notification method according to claim 8, wherein the first message further comprises an ID of a second DRB, wherein the ID of the second DRB is used to replace the ID of the first DRB; and the notification method further comprises:

performing, by the DU, the L2 handling on at least the first DRB or the second DRB.

14. The notification method according to claim 8, wherein the first message is a user equipment (UE) context modification request message and the second message is a UE context modification response message.

15. The notification method according to claim 8, wherein the indication information is the bearer type change.

16. A communications apparatus, deployed on a central unit (CU) in a CU-distributed unit (DU) architecture, the apparatus comprising at least one processor, a transceiver coupled with the at least one processor and configured to communicate with another apparatus, and a non-transitory computer-readable storage medium coupled with the at least one processor and configured to store a program including instructions which, when being executed by the at least one processor, cause the at least one processor to:

send a first message to the DU, the first message comprising an identifier (ID) of a first data radio bearer (DRB) on which a bearer type change occurs and indication information indicating that the bearer type change occurs, wherein the bearer type of the first DRB changes between any two of the following bearer types: a master node (MN) terminated mater cell group (MCG) bearer, a MN terminated secondary cell group (SCG) bearer, a MN terminated split bearer, a secondary node (SN) terminated MCG bearer, a SN terminated SCG bearer, and a SN terminated split bearer, wherein the MCG bearer is a data-plane radio bearer that occupies only air interface resources on an MCG side, the SCG bearer is a data-plane radio bearer that occupies only air interface resources on an SCG side, the split bearer is a data-plane radio bearer that occupies air interface resources on the MCG and SCG sides and that is served by the MN and the SN, the MN terminated indicates a packet data convergence protocol (PDCP) entity in the MN, and the SN terminated indicates a PDCP entity in the SN; and receive a second message sent by the DU, the second message comprising a cell group configuration of a layer 2 (L2) handling.

17. The communications apparatus according to claim 16, wherein performing of the L2 handling further comprises:

media access control (MAC) layer resetting and radio link control RLC layer re-establishment;

changing of a logical channel identifier LCID, and RLC re-establishment;

MAC synchronous reconfiguration and RLC re-establishment; or changing of LCID, and RLC bearer release and add.

18. The communications apparatus according to claim 16, wherein the first message further comprises a master cell group (MCG) indication, and performing of the L2 handling further comprises:

MAC resetting and RLC re-establishment; or the changing of a logical channel identifier LCID, and the RLC re-establishment.

19. The communications apparatus according to claim 16, wherein the first message further comprises a secondary cell group (SCG) indication, and performing of the L2 handling further comprises:

MAC synchronous reconfiguration and RLC re-establishment; or the changing of LCID, and the RLC bearer release and add.

20. The communications apparatus according to claim 16, wherein the first message further comprises:

an ID of a second DRB, wherein the ID of the second DRB is used to replace the ID of the first DRB.

21. The communications apparatus according to claim 16, wherein the first message is a user equipment (UE) context modification request message and the second message is a UE context modification response message.

22. The communications apparatus according to claim 16, wherein the indication information is the bearer type change.

23. A communications apparatus, deployed on a distributed unit (DU) in a central unit (CU)-DU architecture, the apparatus comprising at least one processor, a transceiver coupled with the at least one processor and configured to communicate with another apparatus, and a non-transitory computer-readable storage medium coupled with the at least one processor and configured to store a program including instructions which, when being executed by the at least one processor, cause the at least one processor to:

receive a first message from the CU, the first message comprising an identifier (ID) of a first data radio bearer (DRB) on which a bearer type change occurs and indication information indicating that the bearer type change occurs, wherein the bearer type of the first DRB changes between any two of the following bearer types: a master node (MN) terminated mater cell group (MCG) bearer, a MN terminated secondary cell group (SCG) bearer, a MN terminated split bearer, a secondary node (SN) terminated MCG bearer, a SN terminated SCG bearer, and a SN terminated split bearer, wherein the MCG bearer is a data-plane radio bearer that occupies only air interface resources on an MCG side, the SCG bearer is a data-plane radio bearer that occupies only air interface resources on an SCG side, the split bearer is a data-plane radio bearer that occupies air interface resources on the MCG and SCG sides and that is served by the MN and the SN, the MN terminated indicates a packet data convergence protocol (PDCP) entity in the MN, and the SN terminated indicates a PDCP entity in the SN;

perform a layer 2 (L2) handling; and send a second message to the CU, wherein the second message comprises a cell group configuration of the L2 handling.

24. The communications apparatus according to claim 23, wherein when the first message comprises the ID of the first DRB and the indication information, the processing unit is further configured to:

make a decision and perform the L2 handling.

25. The communications apparatus according to claim 23, wherein performing of the L2 handling further comprises:
media access control (MAC) resetting and radio link control (RLC) layer re-establishment
changing of a logical channel identifier (LCID), and RLC re-establishment;
MAC synchronous reconfiguration and RLC re-establishment; or
changing of LCID, and RLC bearer release and add.

26. The communications apparatus according to claim 23, wherein the first message further comprises a master cell group (MCG) indication, and performing of the L2 handling further comprises:
MAC resetting and RLC re-establishment; or
the changing of a logical channel identifier LCID, and the RLC re-establishment.

27. The communications apparatus according to claim 23, wherein the first message further comprises a secondary cell group (SCG) indication, and performing of the L2 handling further comprises:
MAC synchronous reconfiguration and RLC re-establishment; or
the changing of LCID, and the RLC bearer release and add.

28. The communications apparatus according to claim 23, wherein the first message further comprises an ID of a second DRB, wherein the ID of the second DRB is used to replace the ID of the first DRB; and
the processing unit is further configured to perform the L2 handling on at least the first DRB or the second DRB.

29. The communications apparatus according to claim 23, wherein the first message is a user equipment (UE) context modification request message and the second message is a UE context modification response message.

30. The communications apparatus according to claim 23, wherein the indication information is the bearer type change.

* * * * *